Nov. 8, 1932.  C. FIELD  1,886,661
PLANT APPARATUS AND METHOD FOR MAKING METAL WOOL
Filed June 18, 1927   18 Sheets-Sheet 1
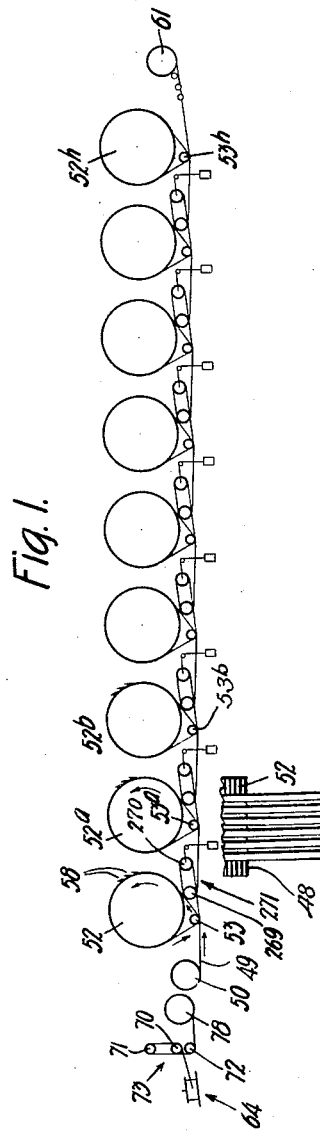
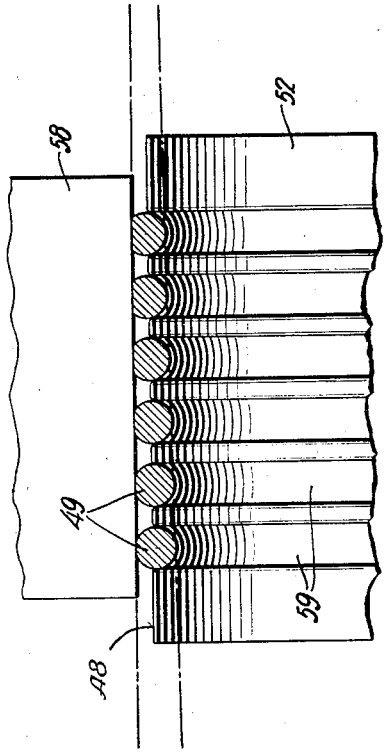
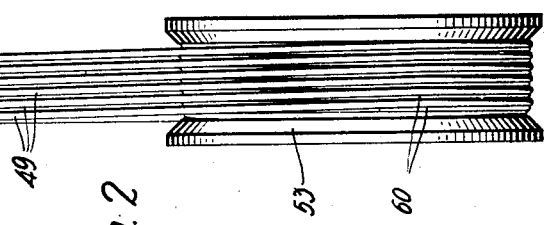
Inventor
Crosby Field.
Attorney Nov. 8, 1932.  C. FIELD  1,886,661
PLANT APPARATUS AND METHOD FOR MAKING METAL WOOL
Filed June 18, 1927  18 Sheets-Sheet 2
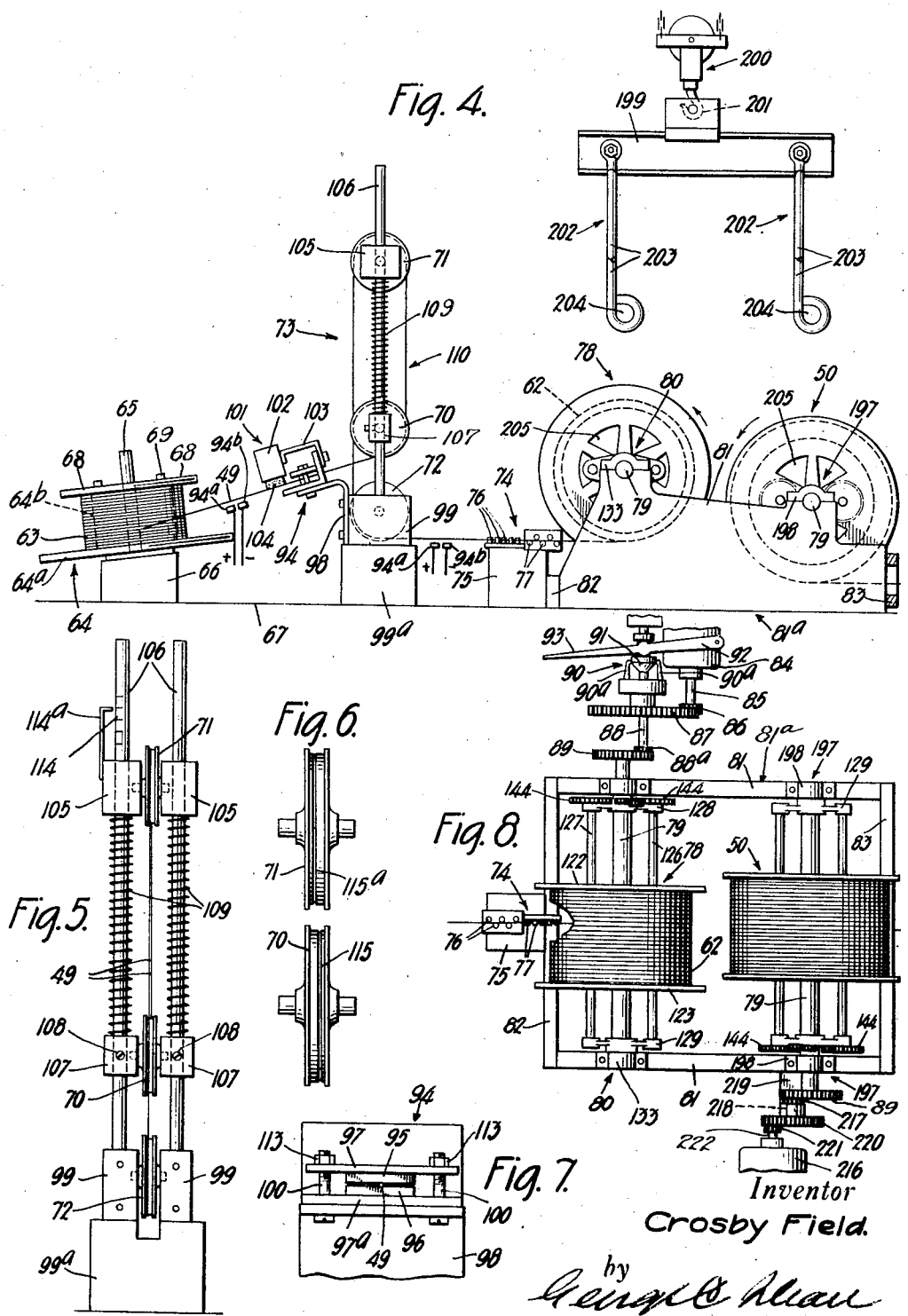
Inventor
Crosby Field.
by
George A. Mann
Attorney Nov. 8, 1932.  C. FIELD  1,886,661

PLANT APPARATUS AND METHOD FOR MAKING METAL WOOL

Filed June 18, 1927   18 Sheets-Sheet 3

Inventor
Crosby Field.
by George C. Dean
Attorney

Nov. 8, 1932.  C. FIELD  1,886,661
PLANT APPARATUS AND METHOD FOR MAKING METAL WOOL
Filed June 18, 1927  18 Sheets-Sheet 4
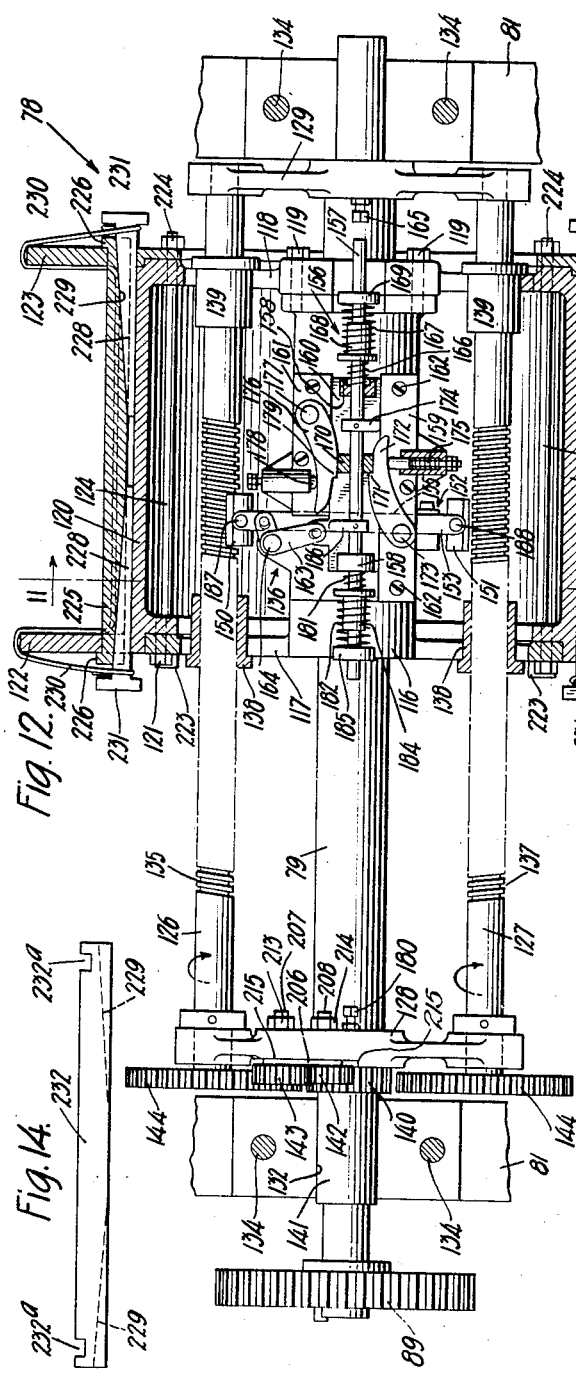
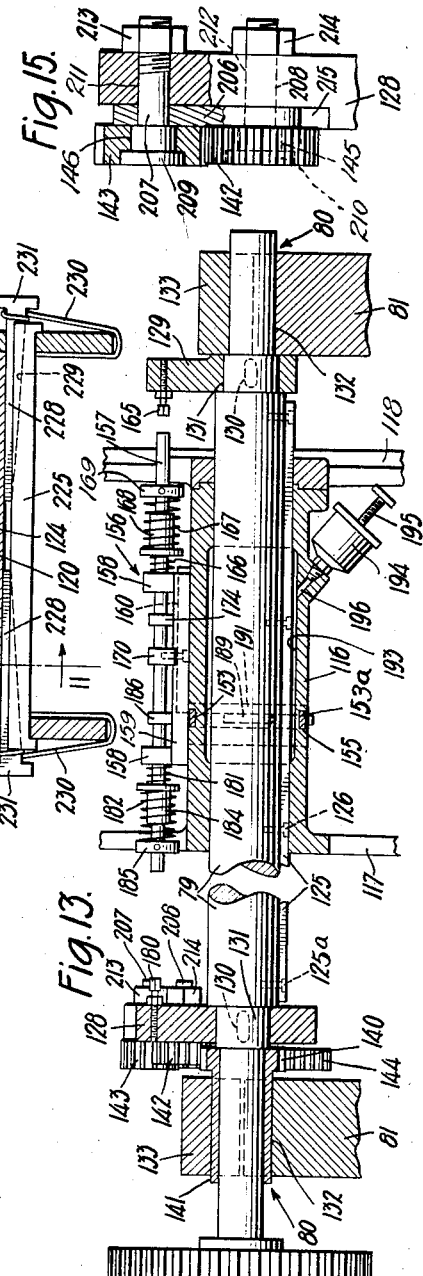
Inventor
Crosby Field.
by George C. Shean
Attorney

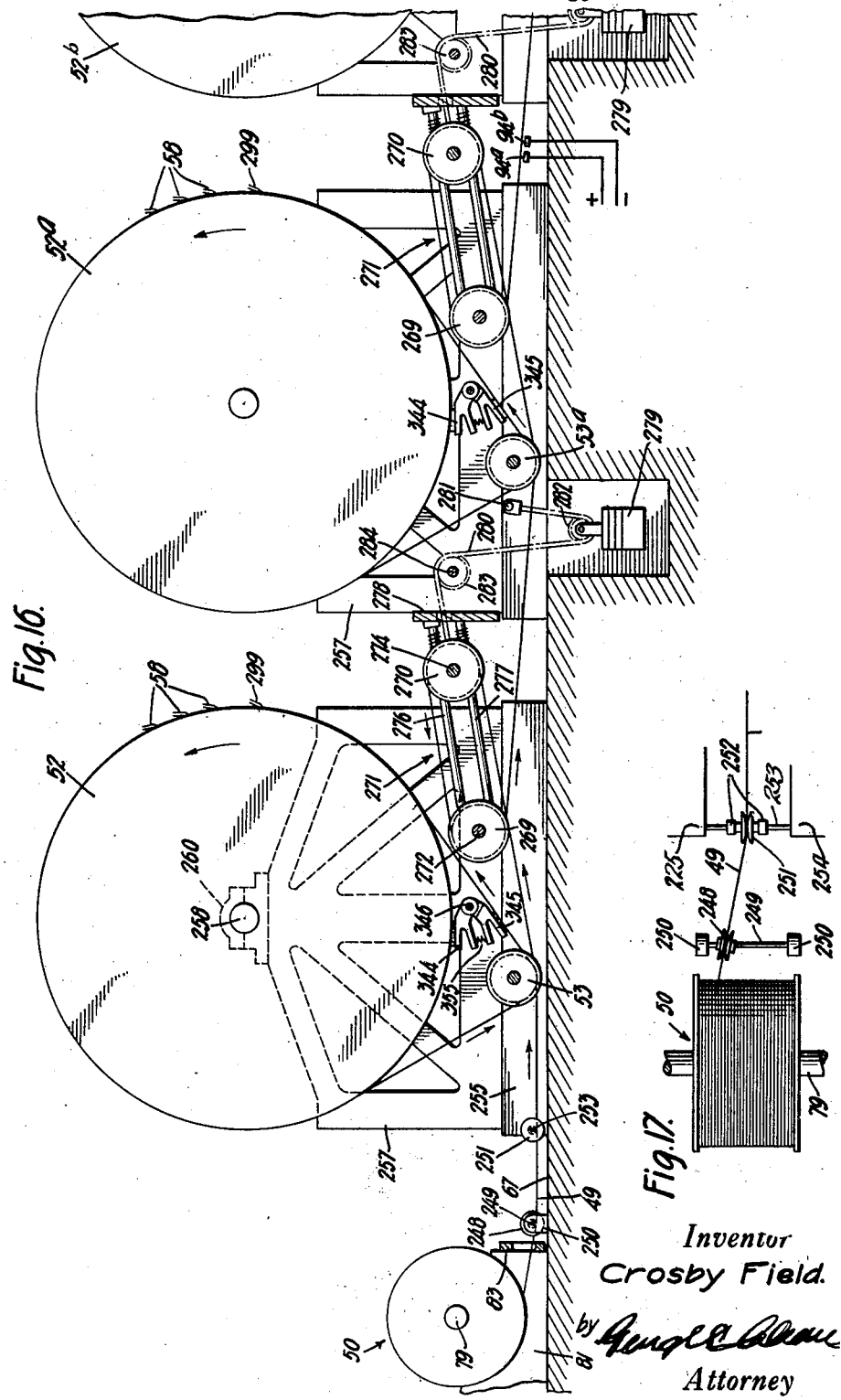

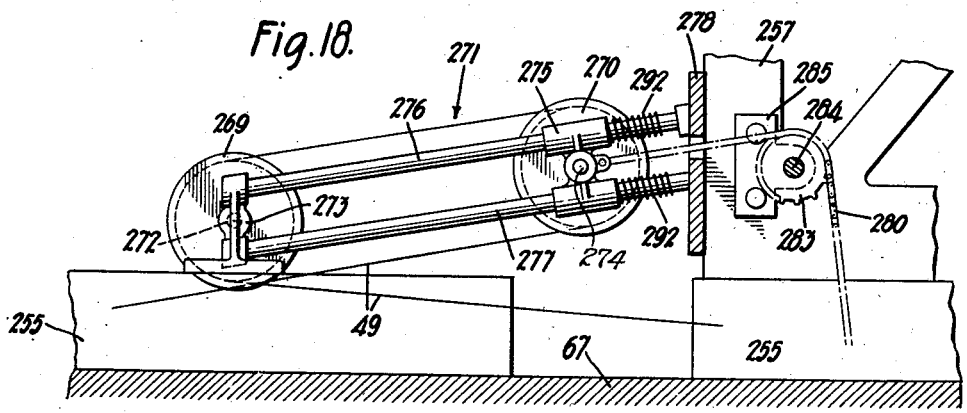
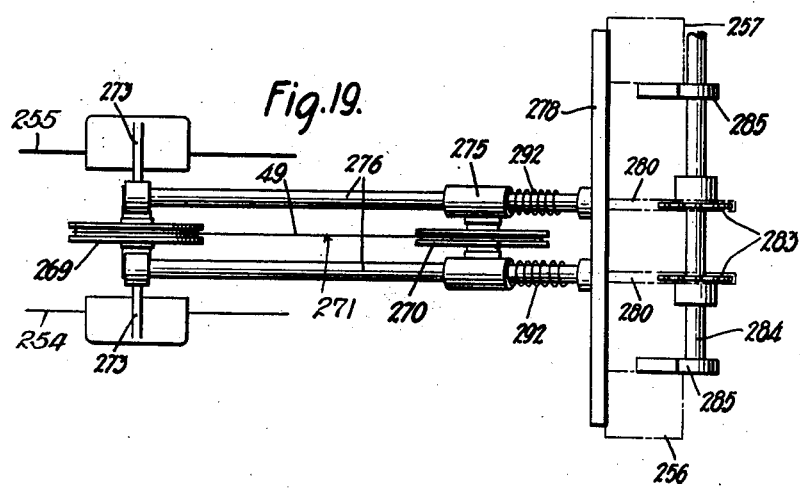
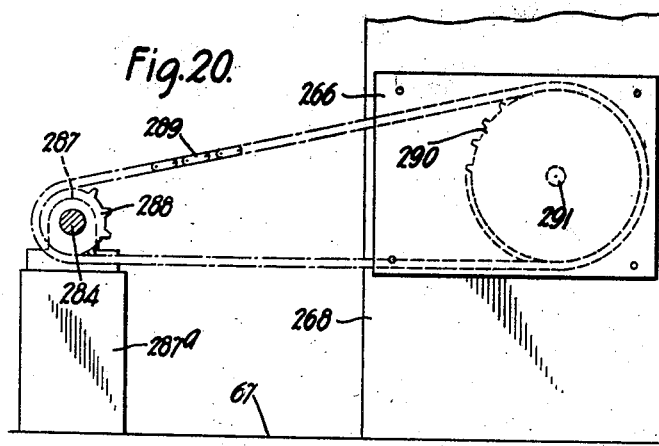

Nov. 8, 1932.　　　　C. FIELD　　　　1,886,661
PLANT APPARATUS AND METHOD FOR MAKING METAL WOOL
Filed June 18, 1927　　18 Sheets-Sheet 7

Inventor
Crosby Field.
by
George A. Khan
Attorney

Nov. 8, 1932.  C. FIELD  1,886,661
PLANT APPARATUS AND METHOD FOR MAKING METAL WOOL
Filed June 18, 1927  18 Sheets-Sheet 8

Inventor
Crosby Field.
by
Attorney

Nov. 8, 1932.  C. FIELD  1,886,661
PLANT APPARATUS AND METHOD FOR MAKING METAL WOOL
Filed June 18, 1927  18 Sheets-Sheet 9

*Inventor*
Crosby Field
by
*Attorney*

Nov. 8, 1932.                  C. FIELD                    1,886,661
            PLANT APPARATUS AND METHOD FOR MAKING METAL WOOL
                   Filed June 18, 1927      18 Sheets-Sheet 10

Inventor
Crosby Field.
by
*George A. Adams*
Attorney

Nov. 8, 1932.                    C. FIELD                    1,886,661
            PLANT APPARATUS AND METHOD FOR MAKING METAL WOOL
                    Filed June 18, 1927    18 Sheets-Sheet 11

Inventor
Crosby Field
by
Attorney

Nov. 8, 1932. C. FIELD 1,886,661

PLANT APPARATUS AND METHOD FOR MAKING METAL WOOL

Filed June 18, 1927 18 Sheets-Sheet 12

Inventor
Crosby Field
by
*George C. Alcan*
Attorney

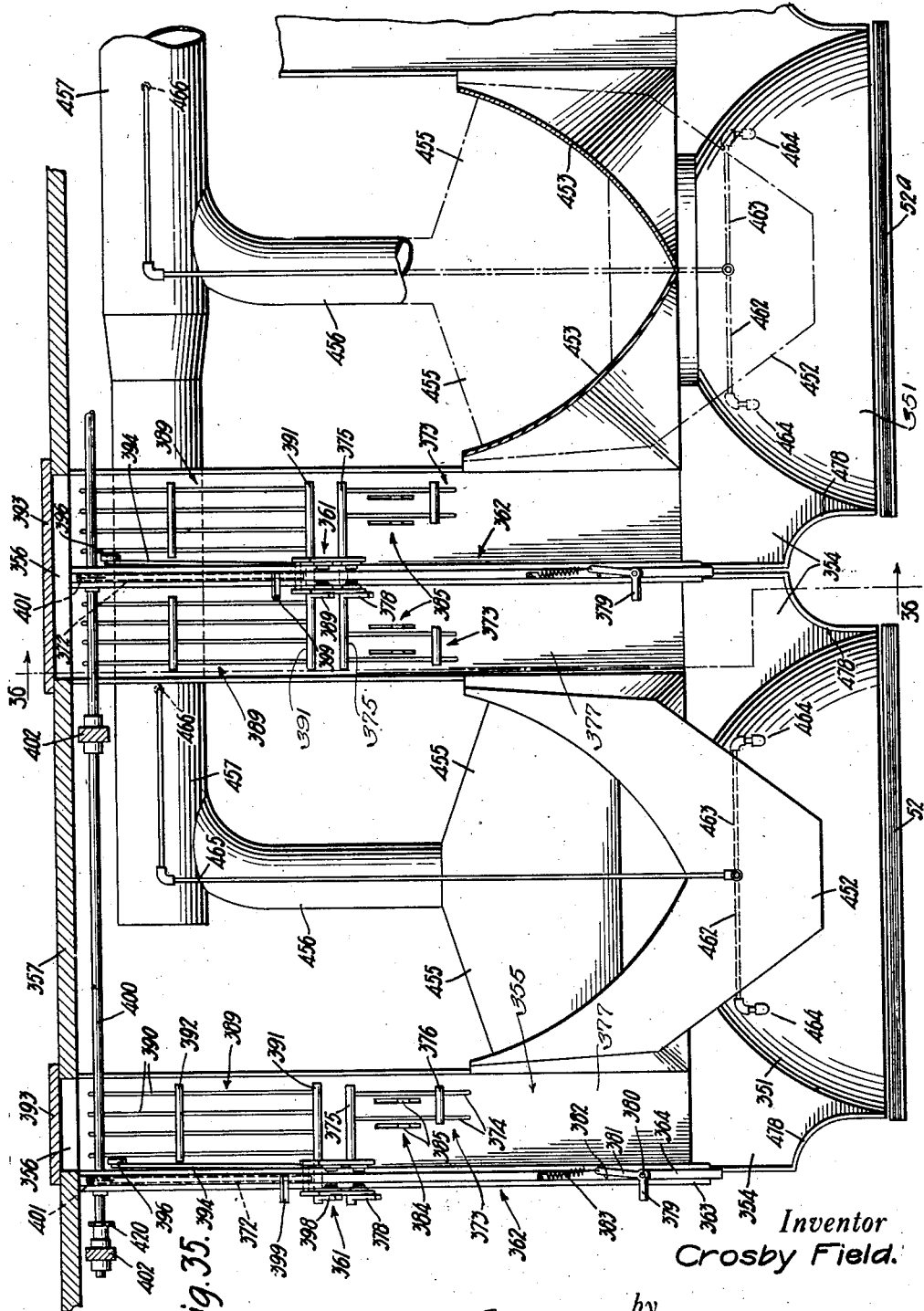

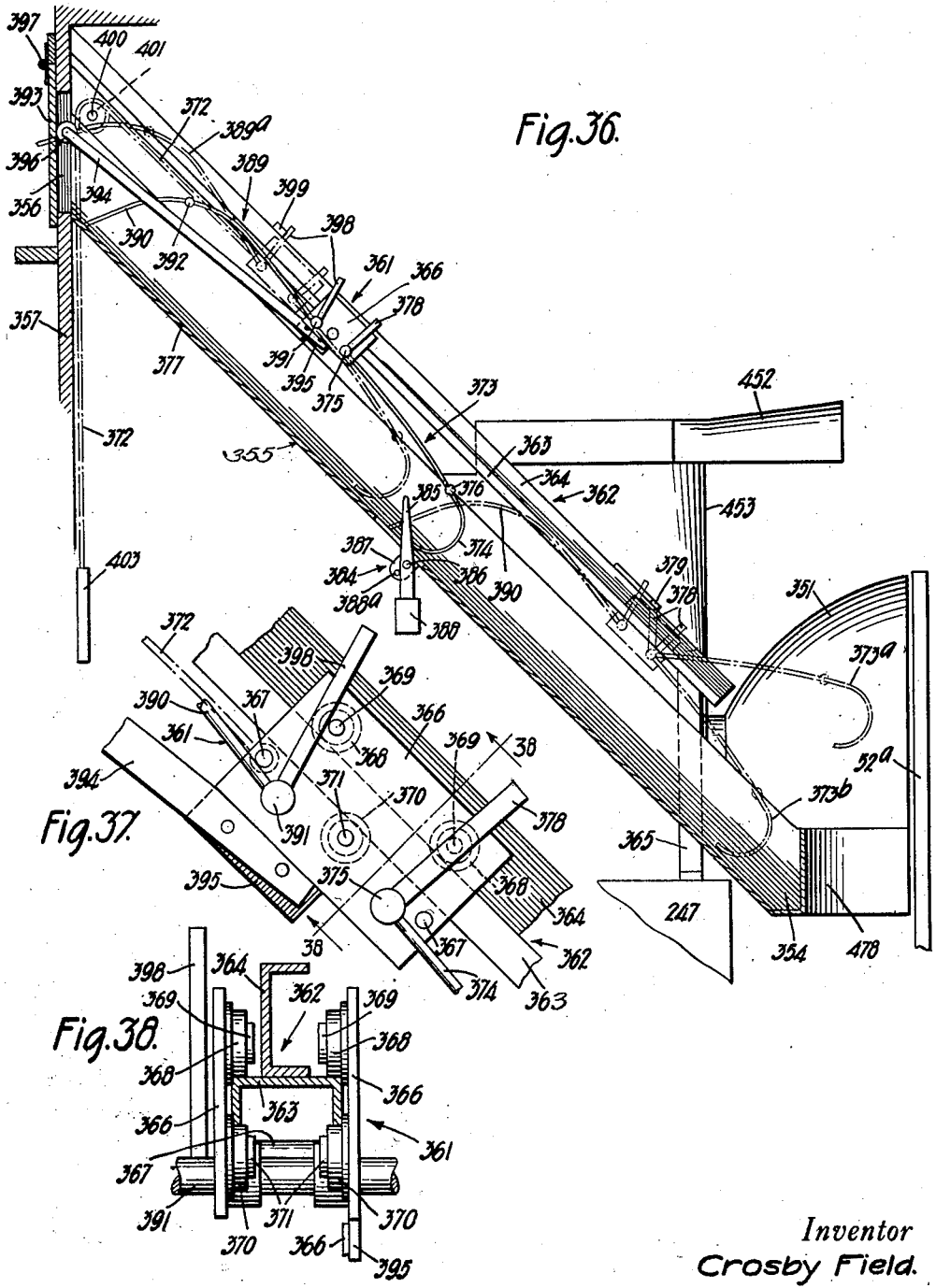

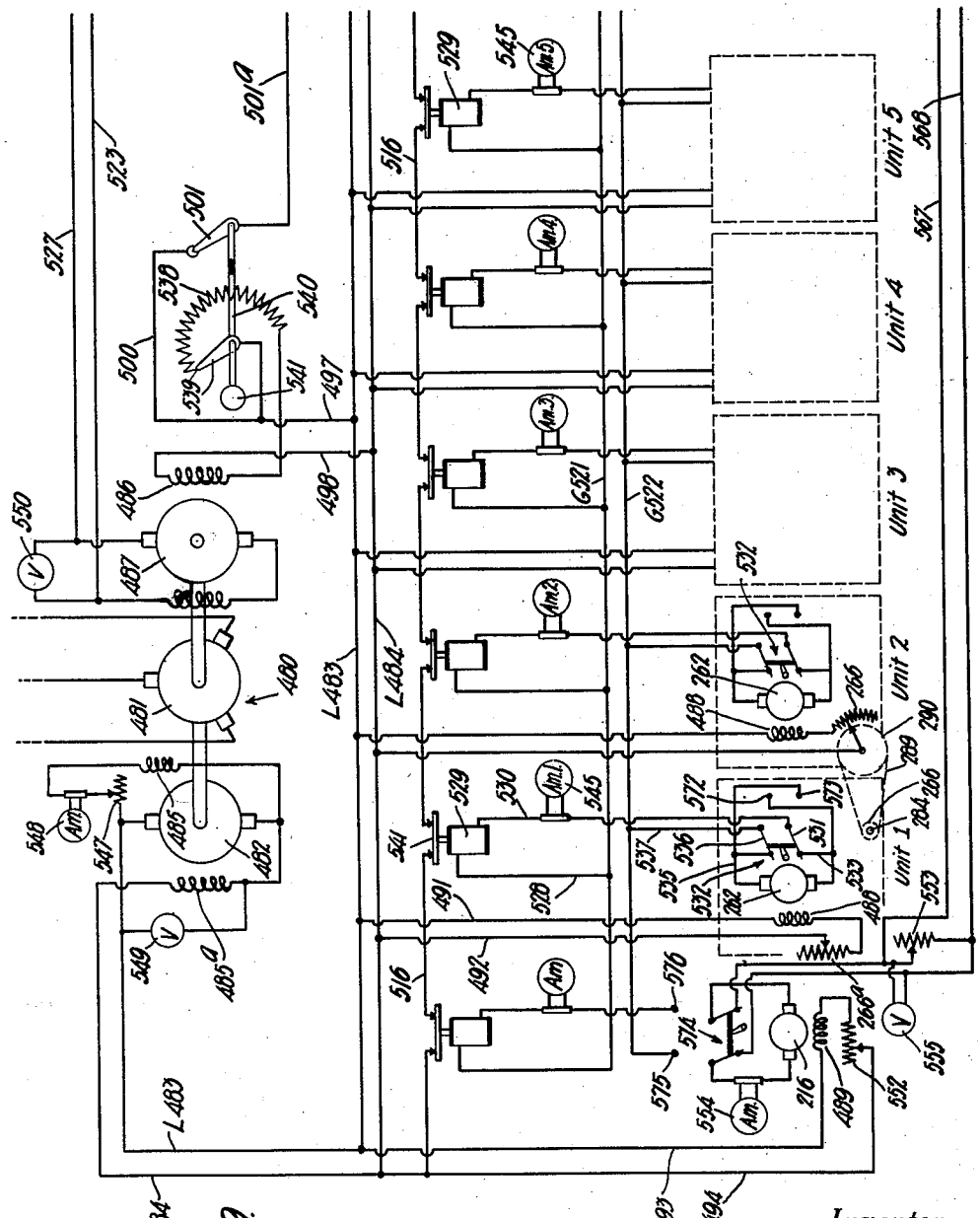

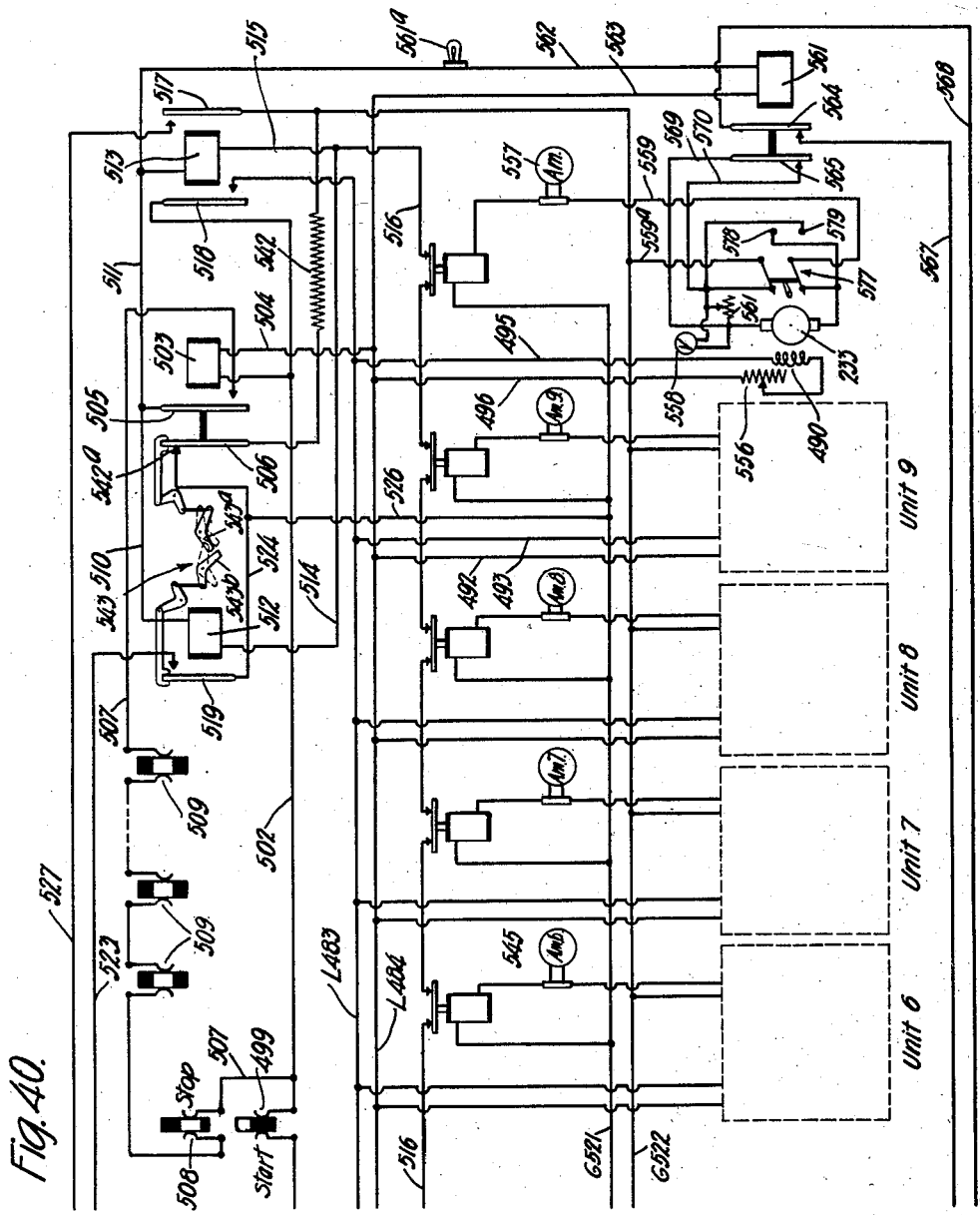

Nov. 8, 1932. C. FIELD 1,886,661
PLANT APPARATUS AND METHOD FOR MAKING METAL WOOL
Filed June 18, 1927 18 Sheets-Sheet 17

Inventor
Crosby Field.
by
Attorney

Nov. 8, 1932.                C. FIELD                 1,886,661
        PLANT APPARATUS AND METHOD FOR MAKING METAL WOOL
                 Filed June 18, 1927     18 Sheets-Sheet 18
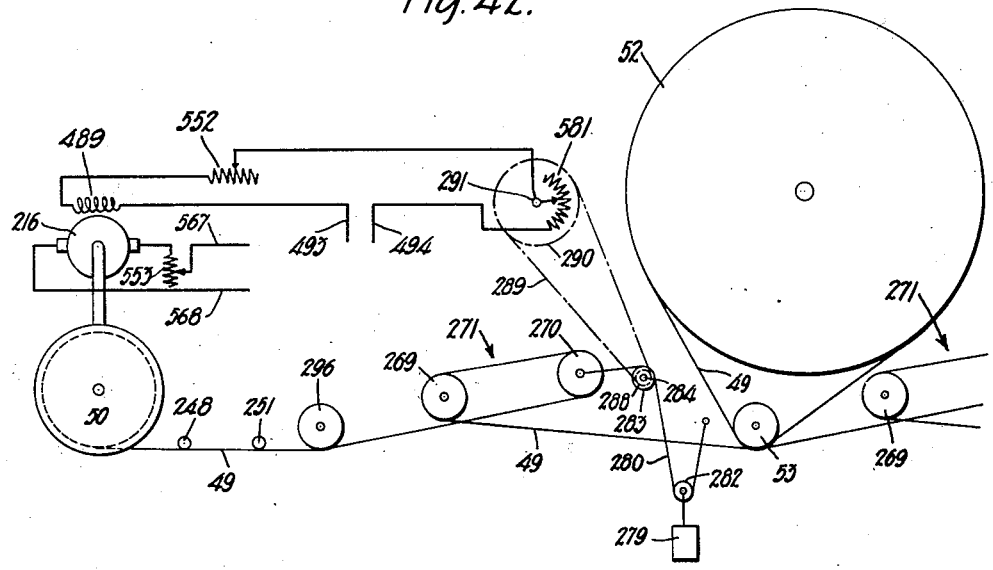
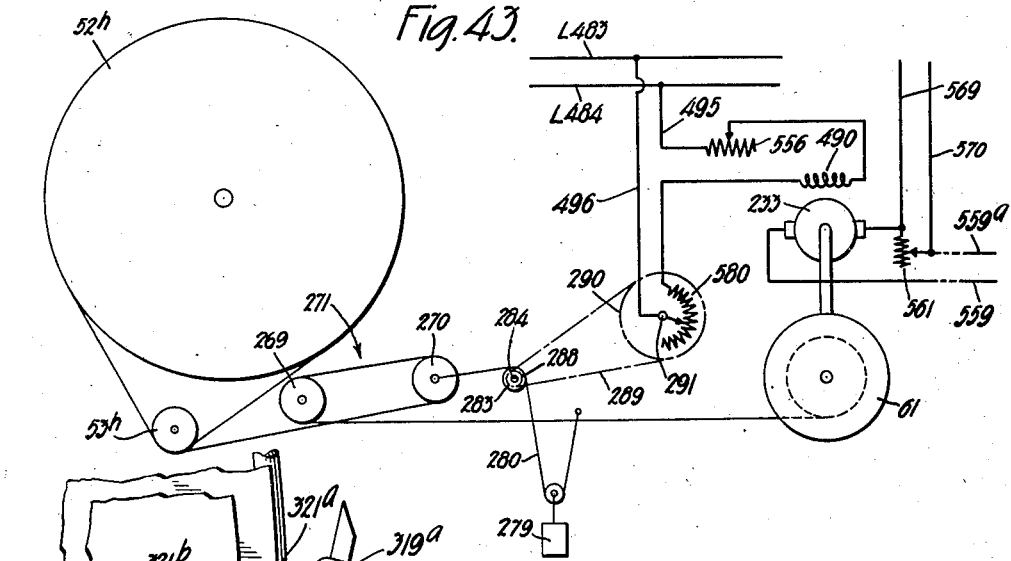
Inventor
Crosby Field.

Patented Nov. 8, 1932

1,886,661

UNITED STATES PATENT OFFICE

CROSBY FIELD, OF BROOKLYN, NEW YORK, ASSIGNOR TO BRILLO MANUFACTURING COMPANY, INC., A CORPORATION OF NEW YORK

PLANT APPARATUS AND METHOD FOR MAKING METAL WOOL

Application filed June 18, 1927. Serial No. 199,692.

My present invention relates to automatic plants and to methods for producing clean metal wool in long substantially uniform strands or fibers, and while many of the apparatus and parts disclosed in my Patents Nos. 1,608,478 and 1,608,481, dated November 23, 1926, may be utilized as constituent elements of my plant, certain features in the nature of improvements on said apparatus may be used with or in place of said patented machines for more satisfactory coaction of the elements, in the operation of the plant as a whole.

In my plant, I use the large diameter power driven traction rotor of my prior patents about which a continuous length of wire is wrapped in successive turns. Cutting tools coact preferably with the upper half of the rotor periphery to shave the wool strands from the wire as the latter revolves therepast. A series of such rotors is preferably employed, about which the wire is continuously wrapped, in order to reduce the wire by a single pass therethrough to the desired wool product. The wire from the last of the rotors being too thin to withstand the strain of shaving, is conducted to a reel on which it is wound in a coil to be disposed of as waste.

According to the present invention, stationary inclined sheet metal guide shields, preferably curved downward, extend from one face of each rotor, the wool produced by the cutting tools sliding along said guide shields, preferably to collecting pockets located between the successive shields.

The metal wool may be removed from these pockets through appropriate chutes, but in the preferred embodiment, these chutes extend obliquely upward in vertical planes parallel to the rotor drive shafts and are equipped with automatically operated conveyor rakes serving to engage and raise the wool along the chutes and to eject it through corresponding doors or gates near the ceiling of the plant for ejection into an adjoining chamber where the product is packaged.

Preferably as in my prior patents, jets of air are applied adjacent the knives to direct the strands of wool away therefrom, so that they will not become twisted and broken by re-engagement with the cutters. In this operation, any minute particles of dust, or chips are also loosened from the individual wool strands. To remove such foreign particles from the wool before it has collected in the pockets, an appropriate ventilator is employed, disposed directly above the guide shields at a position such as to readily take up these particles, without, however, entraining the strands of wool. Preferably the ventilator hoods extend across the space between successive conveyor chutes and communicate laterally with the interiors of the chutes themselves, thereby to separate any further foreign particles loosened from the wool in the action of the conveyor rake. The various ventilators are preferably connected in manner well understood to a common flue with a ventilator fan in an end thereof.

The cooling or cutting fluid, which may be a mineral oil, is applied from a centralized supply system to the surface of the wire being cut.

The freshly cut steel wool is combustible and may be ignited due to the heating of the cutters or other accident. I have discovered that in my plant, such fire may be communicated to the fine wool in the pockets, or oil dust in the flues, so that it spreads rapidly and becomes a serious danger even though the entire construction may be fireproof. To avoid the spread of fire, a sprinkler system is used which includes spray nozzles over the pockets and in the flue, said nozzles being connected with a water main. A series of quick opening valves are provided one at each cutting unit, each of which may be operated by pulling a handle located at a convenient position and connected with the valve in any suitable manner. This enables the water to be sprinkled through said spray nozzles. This not only extinguishes the fire, but wets all surfaces in line of its possible progress, thus obstructing all channels for its spread. The sprinkler being turned on only at the endangered locality there is avoided possible oxidation of the supply of steel wool in other parts of the plant.

As a preliminary step to cleaning the wire as it is fed onto each traction rotor, a wiper is preferably provided with a soft pad to wipe any chips or dust from both the bed of the rotor and the surface of the wire length about to pass upon the rotor.

Inasmuch as wire frequently has spots of hard and unsuitable material formed by segregated manganese or the like, and such spots are not readily shaved by the wool cutting blades employed, the plant is equipped with means which will not only separate such undesirable wire portions, but will segregate the scrap ribbon or shaving thus formed from the steel wool. For this purpose, it is preferred to provide each rotor with a cutter blade of specially hard material, said tool, however, located at the lower part of the rotor below the guide shield, so that any ribbon cut therefrom will drop below the guide shield free from the steel wool. While proper wire is fed to the machine, the auxiliary blade does not function, but when the shaving blades are manually moved to ineffective position, the auxiliary blade will then function to cut off the ribbon of undesirable material, whereupon the machine is restored to normal operation.

The individual rotors are interconnected by appropriate tension controls to avoid breaking the wire due to any temporary speeding up or retardation of any one rotor relative to its neighbors. Automatic electrical control means is employed for this purpose, interlocking the individual drive motors of the respective rotors. The motors are preferably mounted on appropriate foundations in direct alignment with the respective drive shafts of the rotors, and to the rear of the guide shields and of the vertical separating walls. The motors are thereby rendered readily accessible and are kept entirely free from access of wool particles that might be ignited by contact with sparking commutator bars or brushes. The electric interlocking control between the motors, preferably embodies rheostats actuated by the tension control of the rotor drums, said rheostats located immediately in back of the respective rotors in appropriate arches in the foundations of the respective motors.

To avoid frequent disabling of the plant due to rupture of a weak part of the wire, and more especially due to rupture of a defective weld in the end to end connections of the successive commercial lengths of wire, which are preliminarily combined, it is preferred to provide at the inlet end of the plant in advance of the first of the rotors, an appropriate automatic testing appliance, through which the wire is fed preferably on its way to the reel from which the tension rotors are fed. The testing device is so arranged that it will break any part of the length or any welded joint in the wire of insufficient strength, so that the weak section can be excised, or the weak joint re-welded before the deficient part of the wire is fed onto the reel. Preferably, while one reel supplies the wire to the cutting installation, wire is rolled upon another reel, the commercial lengths of said wire being welded together by hand and tested in the manner referred to. When the supply or service reel is about exhausted, it is interchanged with the previously charged reel, to feed the wool cutting mechanism from the latter, and to wind a fresh supply of wire on the previously emptied service reel.

In the present application I have claimed more especially the general correlation of various constituent machine elements and parts in plant operation. Each of the various component elements making up the plant is separately claimed in a distinct divisional application. These divisional applications include the following: Serial No. 297,314, filed August 3, 1928 to the wool cutting machinery; Serial No. 297,317, filed August 3, 1928 to the wool conveyor means; Serial No. 297,316, filed August 3, 1928 to the wire reeling construction; Serial No. 297,315, filed August 3, 1928, to the means for regulating the tension of the wire between the several units of the machine; Serial No. 297,320, filed August 3, 1928 to the wire tester; Serial No. 297,318, filed August 3, 1928 to the system for feeding cutting or cooling fluid; and Serial No. 297,319, filed August 3, 1928 to the electric operating and control arrangement.

Fig. 1 is a diagrammatic front elevation of the machine;

Fig. 2 is an end view showing the loops of wire extending from the cylindrical bed to a roller beneath said bed for transferring the wire from one groove to another of the bed;

Fig. 3 is a detailed view showing the adjacent strands of wire in their respective grooves of the bed and their relation to the knife;

Fig. 4 is a front elevation of the wire testing and winding mechanism;

Fig. 5 is a view of the tension indicating means of the wire tester as seen from the lefthand end in Fig. 4;

Fig. 6 is an end view illustrating the pulleys or rollers of the tension indicating means around which the wire is looped;

Fig. 7 is a detail end view of the friction device associated with the wire tester;

Fig. 8 is a top plan view of the righthand portion of Fig. 4

Fig. 12 is a sectional top plan view of the reel, taken on the line 12—12 of Fig. 11;

Fig. 13 is a detail view of the reel, mainly in section on the line 13—13 of Fig. 11; some of the smaller details being shown in elevation;

Fig. 14 shows another form of beam or bar used in the reel;

Fig. 15 shows the manner of mounting the transmission pinions which drive the feed screws of the reel;

Fig. 16 is a sectional front elevation of the entrance end of the machine showing the path of the wire and the means for automatically controlling the speed of the beds;

Fig. 17 is a detail top plan view showing the manner of guiding the wire from the supply reel to the shaving machine;

Fig. 18 is a detail sectional elevation illustrating the mechanism, including a dancer roller, for controlling the speed of the beds, the section being taken on the line 18—18 of Fig. 21;

Fig. 19 is a top plan view of Fig. 18;

Fig. 20 is a detail sectional front view taken on the line 20—20 of Fig. 21;

Fig. 35 is a top plan view of Fig. 33;

Fig. 36 is a sectional view taken on the line 36—36 of Fig. 35, and illustrates the means for conveying the wool from the machine;

Fig. 37 is a detail view of the elevator carriage of the conveying means;

Fig. 38 is a sectional view of the elevator carriage taken on the line 38—38 of Fig. 37;

Fig. 39 is one-half of an electric wiring diagram of the machine;

Fig. 40 is the other half of the same diagram;

Fig. 42 is a diagrammatic view illustrating the means to automatically control the speed of the supply reel;

Fig. 43 is a diagrammatic view illustrating the means to automatically control the speed of the winding reel which applies the end tension and receives the scrap wire; and Fig. 44 is a front elevation of another form of planing knife.

Figure 9:
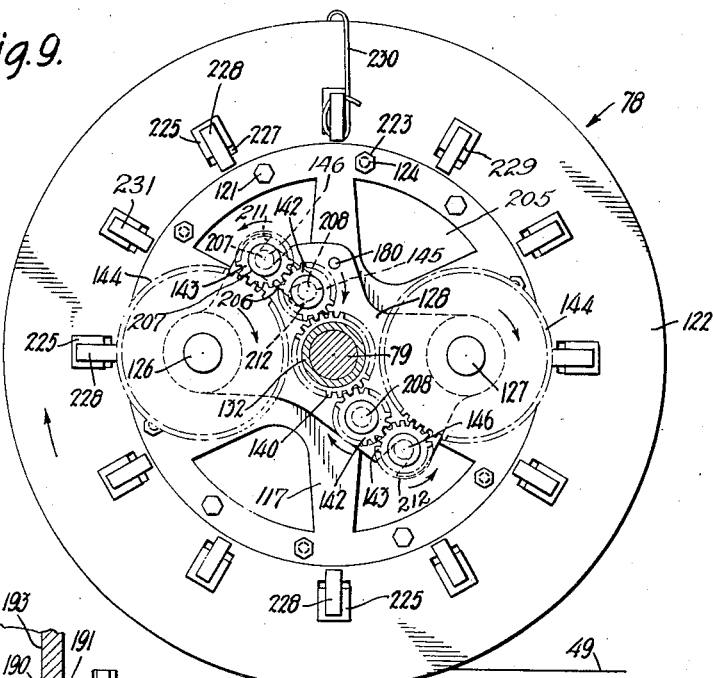
Fig. 9 is an end view of the wire handling reel.
Figure 10:
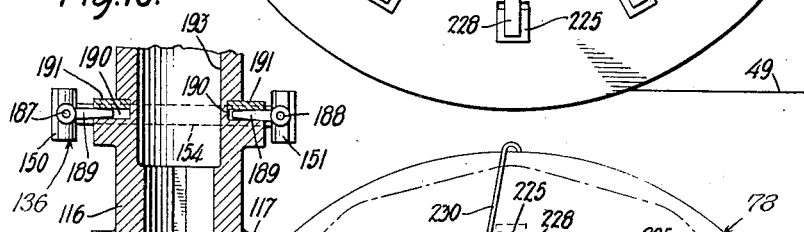
Fig. 10 is a detail sectional view taken on the line 10—10 of Fig. 11.

In my present machine, as in my Patent No. 1,608,481, dated Nov. 23, 1926, a single wire 49 (Fig. 1) may be conducted in single curvature loops, without reverse bending, from a supply reel 50 (Figs. 1 and 16) through one or a succession of cutting units. The first unit includes a cylindrical bed 48 formed in the periphery of a traction wheel or disc 52, which is power driven in a manner hereinafter described. The wire is looped a number of times around the traction wheel 52 and a transfer guide roller 53, in successive parallel grooves 59, 60, and is then conducted to the next cutting unit by suitable guide means including roller 270, hereinafter described, for regulating the speed of the next succeeding wheel bed 52a, in accordance with the speed of said first bed. The wire passes in a loop around said take-up roller 270 and back around another roller 269, which is preferably non-slidable, whence it passes under the transfer guide roller 53a of said succeeding wheel bed 52a. The wire is then looped around the bed 48 and said transfer roller 53a a number of times, and is then looped around a third bed 52b and its transfer roller 53b and so on through as many cutting units as desired. Knives or cutters, 58, are arranged in series around the upper half of the periphery of each bed and extend transversely of the bed, so that each knife edge operates simultaneously on the adjacent loops or strands of the wire 49. The loops or strands lie in grooves, 59, formed in the periphery of the bed, as indicated in Fig. 3. These grooves constitute cutter beds supporting the wire in operative position for shaving by the knives. Each bed wheel is rotated in a direction to carry the wire in one direction loops, without reverse bending, as indicated by arrows in Figs. 1 and 16, so that the upper halves of the loops advance against the edges of the knives while traveling toward the supply end of the machine. The knives being grooved, as in my above mentioned patents, present V-toothed edges to the wire and these operate to cut from the wire a series of separate fiber-like lengths constituting the metal wool product of the machine.

Figure 21:
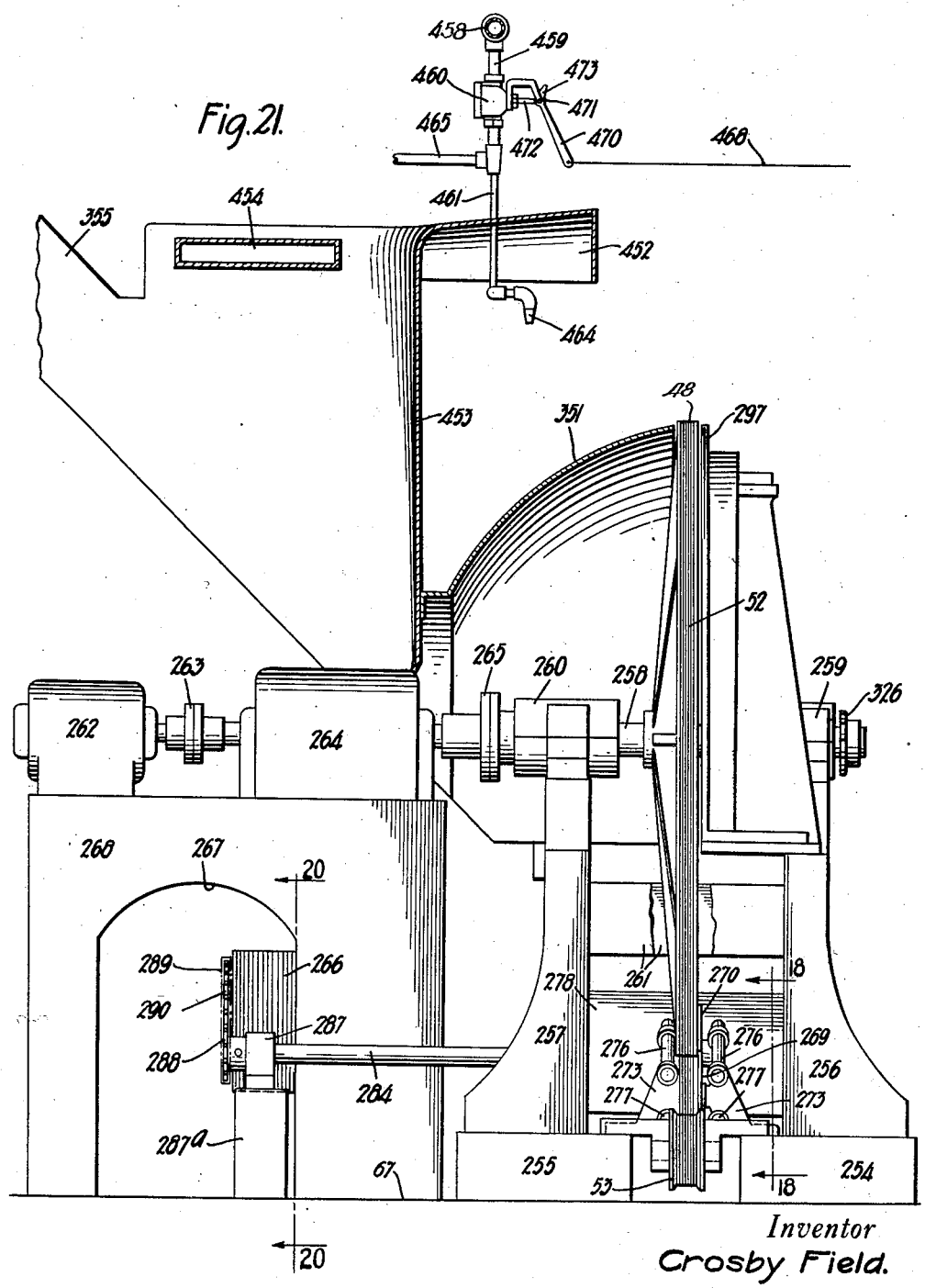
Fig. 21 is an end view of one of the cutting units showing also the wool collecting hood and the means for removing the smoke and dust from the room.

The wire, in passing into the machine, is conducted to the first bed groove of the wheel, this being the groove at the extreme left in Figs. 3 and 21. As the loop of wire passes down from said groove to the transfer guide roller 53, it slants over (Fig. 2) and enters a second groove of the series of grooves 60. Said second groove of the transfer roller lies in the same plane as the second groove 59 of the bed wheel, so that the wire in passing back to the wheel from the guide roller 53, is conducted in a plane registering with the second groove 59 of said wheel 52.

Each time the wire is looped around the wheel bed, it is exposed to the cutting edges of all the knives 58, say 40 to 60 or more in number, and accordingly the wire becomes thinner as it advances through the successive loop paths from the first or entrance groove toward the front or exit groove of the bed, that is, from left to right in Fig. 3. In order to have each cutting edge operate simultaneously on the successively thinned strands, it is necessary to have the successive bed grooves and the cutting edge of the knife correspondingly nearer to each other, so that the space at the right (Fig. 3) is less than at the left.

I prefer to obtain the gradual decrease in space between the effective surfaces of the beds and the cutting edge of the knife by having the successive bed surfaces formed on circles of successively greater diameter, and if the wheel periphery is approximately cylindrical, this results in decreasing depths for the successive grooves 59. This permits having the cutting edge of each knife 58 arranged to operate substantially in the surface of a cylinder of appropriately larger diameter and, in most cases, approximately parallel with the axis of the bed shaft 258. With this arrangement of decreased depth of the grooves 59, the metal is removed across a cylindrical surface exactly transverse to the lengthwise curvature of the wire so that as the wire becomes flatter, it naturally continues to do all its bending and straightening in the same plane in which it was bent and set by the first groove of the machine, whereas an inclined cut surface would cause a twisting resultant for every change in curvature. As the wire 49 advances successively from one groove to another, the slight increases of diameter of the cutter beds tends to retighten the wire. This is important, particularly where the end tension on the wire is only sufficient to maintain good working engagement of the first and last loops with the first and last grooves of each wheel. In such case, the very minute stretching of the wire by each circuit under the knives, would tend to loosen the intermediate loops, but this is compensated by the tightening due to the slight increase of peripheral length of the successive bed grooves.

After the wire has been operated upon at the last bed, 52h, it has been reduced to waste and passes under guide roller 53h to a winding reel 61.

To produce a large coil, 62, of wire (Fig. 4), each of the smaller coils 63 may be successively placed on a reel 64, including a base flange 64a and a core 64b mounted to rotate about a shaft 65 extending upwardly from a support or block 66 on the floor 67. A detachable flange 69 may be secured to the core 64b by screws or bolts 69, to enable the coil 63 to be placed on the reel. The wire 49 is conducted from the reel 64 around rollers 70, 71 and 72, hereinafter described, through a wire straightener 74, supported on a stationary block 75; said straightener having vertically disposed rollers 76 and horizontally disposed rollers 77 between which the wire 49 passes. It is conducted from the straightener 74 to a winding reel 78, carried by a shaft 79. The shaft 79 is rotatably supported in bearings 80 formed in walls 81 of a reel supporting frame 81a, said walls being connected to each other by cross-bars 82 and 83. The reel 78 is rotated in a counter-clockwise direction in Fig. 4 to thus draw the wire 49 from the coil 63 and wind it up.

To drive the shaft 79 and thus rotate the reel 78 in order to wind up the wire 49, there may be provided an electric motor 84, (Fig. 8), having a shaft 85 with a pinion 86 to drive a gear 87, which gear may rotate freely on a suitably supported shaft 88; said shaft having a pinion 88a to drive a gear 89 secured to shaft 79. The gear 87 may be connected with the shaft 88 at will through the medium of a clutch 90, including levers 90a which may be separated by a cone 91 slidable on the shaft 88 to operate the clutch; said cone being operable by a lever 92 having a handle 93. By swinging the lever 92 upwardly in Fig. 8, the cone is withdrawn from between the clutch levers 90, thus disconnecting the gear 87 from the shaft 88 and thus stopping the rotation of the winding reel 78.

When the end of a coil 63 of wire is reached, the rotation of the winding reel 78 is stopped by a manipulation of the clutch controlling lever 92. The flange 68 of the reel 64 is then removed and a fresh coil placed on the core 63. The end of wire from the fresh coil may then be welded to the end of the wire of the preceding reel by any suitable welding device, as 94a, 94b after which the clutch controlling lever 92 is operated to connect the winding reel 78 with the motor.

For testing and breaking weak spots in the wire, so that they may be eliminated before the wire goes to the shaving machine, I provide a friction drag 94, against the pull of the reel 78. The drag includes two blocks 95 and 96, held by the bars 97 and 97a, supported on a fixed bracket 98 secured to bearing blocks 99 in which the roller 72 is supported, the blocks 99 being supported on a foundation 99a of the floor 67. The blocks 95 and 96 clamp the wire and the clamping effect may be adjusted by bolts 100 which are effective to draw the bar 97 towards the bracket 98 in order to increase the pressure of the blocks 95 and 96 on the wire. The tension is adjusted so that any part of the wire that is defective enough to break in the shaving machine will be broken in the tester. The defective part is then cut out and the good ends are welded.

To prevent undue wear of the clamping blocks 95 and 96 by the wire and scoring of the wire by the blocks, as well as to ensure smooth uniform operation, there may be provided a lubricating device 101, which may include a cup 102 supported on a fixed bracket 103. Extending from the lower part of the cup 102 is a felt pad 104 which engages the wire to apply the lubricant thereto from the cup 102.

The uniformity of the tension on the wire while it is being wound on the reel 78 is further promoted by the tension indicating means which include a roller 71, which is floatingly supported by blocks 105 slidingly mounted on vertical rods 106. A cooperating roller 70 is also supported on the rods 106 by means of blocks 107 which are secured to said rods by screws 108. Springs 109, coiled around the rods 106, are interposed between the fixed blocks 107 and the sliding blocks 105, to urge upwardly the blocks 105 with the roller supported thereby. The wire 49 passes from the friction device 94 to the roller 70, then upwardly over and around the roller 71, and then downwardly to form a loop 110. The wire extends around the fixed axis roller 72 to the reel 78, as previously described.

The length of loop 110 varies according to the adjustment of the friction device 94. When the pressure of the friction device 94 is increased, which may be accomplished by manipulating the nuts 113 of the bolts 100, the tension of loop 110 is increased, thus pulling the roller 71 downwardly against increasing opposition of the springs 109.

The bodily movement of the roller 71 is utilized to indicate the tension on the wire, a pointer 114a being secured on one of the blocks 105, and a graduated scale 114 on one of the rods 106. To prevent touching or rubbing where the wire 49 crosses below the roller 70 (Fig. 4), the wire is guided in a groove 115 (Fig. 6) which is off-set in a plane to one side of a similar groove 115a, formed in the upper roller 71, from which upper roller the wire extends downwardly to another grooved roller 72. Thus the wire slants slightly from the roller 70 to the roller 71 and extends vertically downward from the roller 71 to clear that stretch of the wire extending from the supply reel 64 to the roller 70.

The reel structure includes a hub portion 116 to slide on the shaft 79 (Figs. 8 to 13 inclusive) and two spoked ends 117 and 118, the end 117 being integral with the hub 116, the end 118 being secured to the hub by screws 119. The reel further includes a drum 120 which may be integral with the spoked end 118 and extends therefrom to the spoked end 117, where it is secured to the latter by screws 121. End flanges 122 and 123 confine the coil of wire on the drum. The flange 122 may be integral with the drum 120. The flange 123, however, may be detachably secured to the reel by bolts 124, so that the coil of wire may be readily removed from the reel in a manner hereinafter described.

The reel 78 is caused to rotate with the shaft 79 by means of a key 125 extending along the shaft, which key may be secured thereto by screws at 125a (Fig. 13). Provision is made to feed the drum axially on said shaft, first in one direction and then in the other as the wire is wound on the reel and advances from one flange to the other.

To feed the reel 78 axially on the shaft 79, while it is being rotated to wind up the wire, screws 126 and 127 are provided, said screws being supported at one end in a bracket or cross bar 128 and at the other end by a bracket or cross bar 129, said brackets being secured by keys 130 (Fig. 13) on reduced portions 131 of the shaft 79. The shaft lies in depressions 132 of the bearings 80 and is held in place by bearing caps 133 secured to the end walls in any suitable manner as by screws 134.

The screw 126 is provided with a left hand thread 135 to feed the reel in one direction (to the right in Fig. 14) by a screw engaging device or mechanism 136, hereinafter described, carried by the reel. The screw 127 is provided with a right hand thread 137 which is effective, when cooperating with the screw engaging mechanism 136, to feed the drum in the opposite direction, which is to the left in Fig. 14. The screws 126 and 127 extend through bearings or guides 138 and 139 (Figs. 11 and 14) secured respectively to the spoked ends 117 and 118 of the reel; the screws being caused to rotate in the direction of the arrows as indicated (Figs. 9 and 12) when the wire is being wound on said reel.

To effect rotation of the feed screws 126 and 127, there may be provided planetary gearing including a central or sun gear 140, which may be integral with a bearing sleeve 141 for the left-hand end of the shaft 79 (Figs. 12 and 13), said bearing sleeve being held securely on the end plate 81 of the frame work by the cap 133. Each feed screw is rotated by a pinion 142 meshing with the sun gear 140, the pinion 142 meshing with an intermediate pinion 143 which drives a gear 144, there being two of these trains of gearing, one for each screw. The pinions 142 and 143 rotate on studs 145 and 146, respectively, secured to the cross bar 128 which, it will be remembered, supports the screws 126 and 127 at one end. Thus, as the shaft 79 rotates in a clockwise direction (Fig. 9) to wind the wire on the reel, the pinions 142 and 143 and the gear 144 are carried bodily around the sun gear 140 and since the pinion 142 meshes with said sun gear, it is caused to rotate and thus drive the gear 144 through the intermediate pinion 143, thus rotating the screw 126 to feed the reel to the right in Fig. 12. Thus during the rotation of the shaft 79, both screws 126 and 127 are rotated in the same direction through planetary gearing, said direction depending on the position of the screw engaging mechanism 136.

The screw engaging mechanism 136 includes a follower or half nut 150 to cooperate with the screw 126 and a follower or screw engaging element 151 to cooperate with the screw 127. Said followers are supported on a slide 152 including bars 153 and 153a (Figs. 11 and 12), which bars are suitably guided in slots 155 formed in the hub 116 of the reel 78. The slide 152 may be shifted, in a manner hereinafter described, transversely of the hub 116 to disengage the screw 126 and to engage the screw 127, to effect the reversal of the feeding of the reel, when the wire being wound on the reel reaches the flange 122.

The reversal of the feed of the reel 78 which results from the shifting of the screw-engaging mechanism 136, is effected automatically. To this end there is provided a trigger mechanism 156 (Figs. 12 and 13), operated in a manner hereinafter described, which mechanism may include a plunger 157 supported in brackets 158 of a slide 160 supported between guide-ways 159 and 161, which guide-ways may be secured to the hub 116 by screws 162.

The slide 160, which may be moved in the direction of the plunger 157, in the manner hereinafter described, may be connected with the bar 153 of the screw engaging slide 152 by means of a bell crank 163 pivoted on a stud 164 secured to the hub 116, so that when the slide 160 is moved to the left in Fig. 12, the bell crank is swung about its pivot 164 to move the screw engaging slide 152 out of engagement with the feed screw 126 and into engagement with the feed screw 127. When the slide is moved in the opposite direction, however, the screw engaging slide is disconnected from the feed screw 127 and connected with the feed screw 126.

To operate the plunger 157 of the trigger mechanism, it engages a stop or set screw 165 adjustably secured to the cross bar or bracket 129 during the rightward feed of the reel in Fig. 12. After the plunger engages the stop, the reel continues to feed rightwardly, thus causing a relative leftward movement of the plunger 157 against the action of the springs 166 and 167; the spring 166 being held between the bracket 158 and a flange sleeve 168 slidingly supported on the plunger 157, and spring 167 being supported between the flange sleeve 168 and a collar 169 secured to the plunger. These springs are compressed when the plunger is operated and tend to force the slide 160 leftwardly. Said slide is locked, however, by a lug 170 secured thereto and extending upwardly therefrom into engagement with a shoulder 171 of a pawl 172 pivotally supported by a stud 173 on the fixed guide-way 159. The plunger 157 slides freely through the lug 170 and as it moves leftwardly, a finger 174 secured thereto, engages the free end of the pawl 172 to swing said pawl about its pivot 173, against the action of a spring pressed plunger 175 to disengage said pawl from the lug 170. Immediately following the release of the slide 160, it is moved leftwardly by the action of the springs 166 and 167, to thus actuate the bell crank 163 in a clockwise direction and thus shift the screw engaging slide or device 152 out of engagement with the feed screw 126 and into engagement with the screw 127. After the shifting of the screw engaging device 152, a pawl 176, similar to the pawl 172, is swung about its pivot 177 by a spring pressed plunger 178 to cause a shoulder 179 of said pawl to engage behind the lug 170 of the slide 160 and thus hold said slide against the rightward movement or, in other words, locking the screw engaging device 152 in engagement with the feed screw 127. It will be understood that the pawl 172, when effective, holds the slide 160 against leftward movement, to lock screw engaging device 152 in engagement with the feed screw 126.

Thus, when the screw engaging device is in engagement with the feed screw 127, it is fed leftwardly until the lefthand end of the plunger 157 strikes an adjustable stop 180 secured to the cross bar or bracket 128, to effect an actuation of the reversing mechanism, as the drum approaches its extreme lefthand position. When the plunger engages the stop 180, it is moved against the action of springs 181 and 182, the spring 181 being confined between a lug 158 secured to the slide 160, and a sleeve 184 carried by the plunger 157, the spring 182 being confined between said sleeve 184 and a collar 185 secured to the plunger 157. The springs 181 and 182 are similar to the springs 166 and 167 at the opposite side of the plunger, and the former springs tend to move the slide 160 toward the right in Fig. 12, said slide being locked, however, by the pawl 176. As the plunger advances in its rightward movement, a finger 130

186 thereon swings the pawl 176, against the action of the spring pressed plunger 178, out of engagement with the lug 170, thus releasing the slide 160. Subsequently, the action of the springs 181 and 182 actuates the slide to move it rightwardly and thus actuates the bell crank 163 in a counterclockwise direction to thus move the screw engaging device 152 out of engagement with the feed screw 127 and into engagement with the feed screw 126, to again effect a leftward feed of the reel 78.

To effect easy engagements of the screw engaging elements or half nuts 150 and 151 with the feed screws 126 and 127, respectively, modified square threads may be used which are slightly tapered, each thread being slightly narrower at the outside than at the base, so as to afford easy entrance of the internal threads of the half nuts between the threads of the screws. The half nuts 150 and 151 are each swingingly supported by pivots 187 and 188 (Figs. 10, 11 and 12) so that said elements may adjust themselves to the screws in effecting an engagement therewith. The pivotal movement of said half nuts is comparatively slight, however, and is limited by tails 189 extending from each into a slot 190 formed in the hub 116, and by vertical bars or straps 191 secured to said hub. By inspection of Fig. 10, it will be noticed that said tails 189 are slightly tapered and actuate the full width of the slot when in their ineffective positions, thus preventing shaking thereof. When moved to their effective positions, however, into contact with the screw, the wide end of the tail moves out of the slot and the narrow end advances in the slot, thus permitting sufficient pivotal movement of the screw engaging element or half nut to accommodate itself to the feed screw. The straps 191 may be secured to the hub by screws 192 (Fig. 11) and also assist in holding the bars 153 and 154, of the screw engaging device or slide 152, in their slots or guideways.

To lubricate the reel supporting shaft 79 so as to prevent undue rubbing and consequent wear of the reel on said shaft, there may be provided a lubricating or grease chamber 193 (Fig. 13) formed in the hub 116 of the reel; said chamber extending around the shaft 79. A grease cup 194, which may be filled in any well known manner, is provided with a screw 195 to force the grease at will from said cup through a duct 196 into the grease chamber 193.

After the reel 78 has been wound full of wire in the testing mechanism, it may be removed from the bearing 80 and placed on a bearing 197 to supply the wire thereon to the cutting units or shaving machine. It will be understood that while the wire is being wound on the reel 78, it is supported on bearing 80 and the reel 50 is being unwound; the latter may become exhausted about the same time that the winding reel becomes filled. Accordingly, the reels 50 and 78 may be interchanged in a single operation.

To facilitate the interchanging of the filled reel and the empty reel, the bearing cap 133 and a bearing cap 198 of the bearing 197 are removed. A swinging beam 199 (Fig. 4) is then lowered by a hoist 200 on which the beam is carried by means of a hook 201. The beam is provided with two yokes 202, including arms 203 provided with eyes or loops 204 at their lower ends. As the beam 199 is lowered, the yokes 202 straddle the reels 50 and 78 and the eyes 204 are brought into alignment with apertures 205 formed in the spoked ends of the reels. Straight bars (not shown) may then be inserted through the eyes 204 and through the apertures 205 to thus connect the reels with the yokes 202, after which the reels may be elevated by means of the hoist 200, the bearing caps 133 and 198 having previously been removed. After the reels are raised clear of the side walls 81 of the reel supporting frame, the beam 199 is turned around in the opposite direction so as to interchange the positions of said reels. The reels may then be lowered by the hoist 200 so as to locate the filled reel on the bearing 197, from which reel the wire is then supplied to the shaving machine, and locate the empty reel 50 on the bearing 80 to receive a fresh supply of wire. It will be understood that after the reels have been interchanged, the bearing caps 133 and 198 are again secured in position. The point of application of the hoist 200 is located in a position on the beams 199 so that the reels 50 and 78, when carried by said beam, balance each other.

It will be understood that the planetary gearing, including the sun gear 140, is carried by the shaft 79 and consequently it is interchanged with reel. When, however, the reel is placed on the bearing 197, the reel feeding means is thrown out of action so that the reel may remain in a fixed position lengthwise of the shaft 72. Suitable means, hereinafter described, being provided to conduct the wire from the supply reel to the first bed of the shaving machine.

To disconnect the reel feeding mechanism, the pinions 142 and 143 of the planetary gearing which, it will be remembered is effective to rotate the feed screws 126 and 127, are carried by a support or bar 206, adjustably mounted on the cross bar of bracket 128 (Figs. 9, 12 and 15) so that the pinions 143 may be swung out of engagement with the gears 144 of the feed screws 126 and 127, said pinions rotating idly when the wire is being unwound from the reel.

To shiftingly support the pinions 142 and 143, they are supported on bolts 207 and 208, respectively, said bolts having heads 209 and 210 upon which the pinions are rotatably supported. The bolts extend through the bar 206 and through slots 211 and 212 formed in the cross bar 128, said bolts being held in place by nuts 213 and 214 which draw the bar 206 tightly against a depressed face 215 formed on the cross bar 128. When it is desired to disconnect the pinion 143, the nuts 213 and 214 are loosened and the pinion carrying bar 206 is swung about the bolt 208 to carry the pinion 143 out of engagement with the gear 144, after which the nuts 213 and 214 are again tightened to secure the pinions in their ineffective positions.

In another adjustment of the pinion carrying bar 206, each feed screw 126 and 127 may be connected to rotate in the opposite direction. It will be seen by an inspection of Fig. 9, that the slot 212 is slightly elongated and after the nuts 213 and 214 have been loosened, the bolt 208 may be moved to the other end of the slot so as to carry the pinion 142 into engagement with the gear 144, the pinion 143 being at the same time disengaged from the gear 144, so that the gear 144 of the screw is rotated directly by the pinion 142 instead of the pinion 143. It will be understood that the nuts 213 and 214 are again tightened after the setting of the pinions.

When the reel is used to supply wire to the shaving machine, an ordinary cylindrical drum is used and the mechanism is connected with suitable braking means to assist in keeping the wire taut, in this case an electric generator 216 connected to the reel supporting shaft 79. As the reel is rotated by the unwinding of the wire, the gear 89 on the shaft 79 drives a pinion 217 secured to a shaft 218 supported in a bracket 219, which bracket may be secured to the wall 81 of the reel supporting frame. The shaft 218 has secured thereto a gear 220 driving a pinion 221 secured to the generator shaft 222. Thus it will be understood that the generator serves as a braking means not only to keep the wire taut, but also to assist in bringing the reel to a stop when the shaving machine is stopped.

Figure 11:
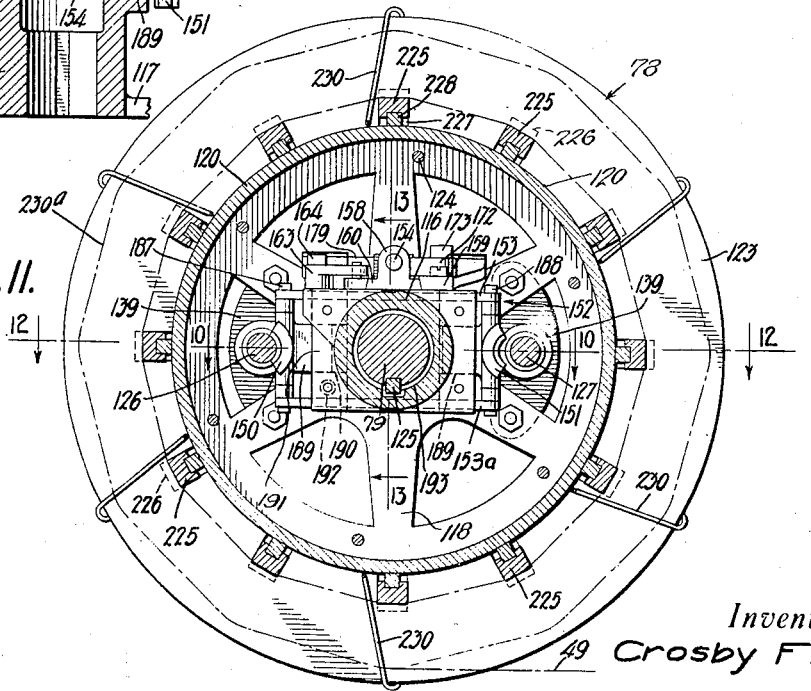
Fig. 11 is a sectional view taken on the line 11—11 of Fig. 12.

The reel 61 which receives the waste wire at the exit end of the machine (Fig. 1) is like the reels 50 and 78 previously described, any one of these reels being used in the various locations. To facilitate the removal of the coil of waste wire from the reel, the flange 123 (Fig. 12) is detachably supported thereon and may be held in its assembled position by bolts 124, having heads 223 engaging one side of the reel and nuts 224 engaging the flange 123 at the other end of the reel. Beams or bars 225 are arranged around the periphery of the drum 120 of said reel. Each beam has projections 226 at its ends to engage the outside of the flanges 122 and 123 to thus prevent spreading thereof, and consequently assist in holding the flanges 123 on the reel. Said beams 225 are located in slots 227 formed in the flanges 122 and 123 (Fig. 9) which slots are large enough to permit insertion or removal of said beams therethrough. After the insertion of each beam through a slot, it is moved radially on the reel, and away from the reel axis, into engaging relation with the flanges 122 and 123 to hold each beam in its effective holding position. Wedges 228 are provided which extend into grooves 229 formed in the beams, said wedges engaging the bottom of said grooves and the periphery of the drum. With this arrangement, the wire is not carried directly by the drum 120, but is supported by the means 225, as indicated in Fig. 11, so that stresses produced by the weight of the wire are actually in the ends of the reel and not in the drum 225. When the reel is used to wind on scrap, the feeding mechanism, including the screws 126, 127, operates as previously described in connection with the testing mechanism.

To facilitate the removal of the coil 230a of waste wire from the reel, provision is made for binding the coil before the removal from the drum. To this end, binding wires 230 may be stretched over the drum from side to side thereof and bent over the flanges 122 and 123 so that their ends may be twisted around the protruding ends of the wedges 228. When the reel has become filled, the ends of the binding wires are untwisted from the wedges and are brought together and twisted over the coil to thus bind the latter. After the coil has been thus bound, the reel, with its supporting shaft 79, may be removed from its bearings. The wedges may then be removed, their ends being provided with heads 231 to be engaged by a suitable wedge removing tool, not shown. After the wedges have been removed, each bar may be moved radially toward the axis of the drum, to enable it to be withdrawn through the slots 227. The flange 123 may then be removed from the drum 120 by loosening the nuts 224. The reel is then set up on end so as to cause the coil of wire to slide down from the drum at the end from which the flange has previously been removed. After the removal of the coil of waste wire, the reel may be reassembled for future use.

A modified form of beam 232 (Fig. 14) may be used instead of the beam 225, and it may be provided with slots 232a so that each of the flanges 122 and 123 may be embraced by the bar or, in other words, engaged on both sides, thus adding to the rigidity of the reel.

Figure 31:
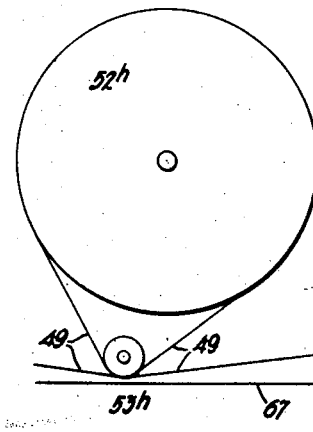
Fig. 31 is a diagrammatic front view showing the means for conducting the wire from the bed at the exit end of the machine to the waste winding reel or drum.

To drive the scrap winding wheel, there may be provided an electric motor 233 (Fig. 31) supported on a foundation 234 on the floor 67. Said motor has on its shaft 235 a pinion 236 to drive a gear 237 secured to a shaft 238, which shaft may be supported on a bearing or bracket 239 extending upwardly from the floor 67. Secured to the shaft 238 is a pinion 240, which meshes with the gear 89 of the reel supporting shaft 79 to rotate the reel in a counterclockwise direction and thus wind the scrap wire thereon. The reel, upon which the scrap wire is wound, may be supported on brackets 241, one at each side of the reel, each bracket being provided with a bearing 242, including a bearing cap 243 which may be removed to facilitate the removal of the reel preparatory to removing the coil of waste wire therefrom.

Figure 32:
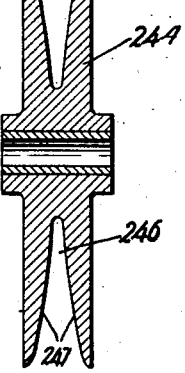
Fig. 32 is a sectional view of one of the guide rollers used in conducting the wire through the machine.

To conduct wire from the guide rollers 53h associated with the last bed 52h, at the exit end of the machine, there may be provided a plurality of guide rollers 244, supported on a bracket 245, which bracket may be secured to the floor 67. Each of the guide rollers 244 may be provided with a deep groove 246, having curved sides 247 (Fig. 32) of apparently large radius, which conduct the wire to the bottom of the groove 246.

When the wire is fed from the reel 50 to the shaving machine (Figs. 8, 16 and 17), it remains stationary on the shaft, or, in other words, does not feed laterally thereon. Accordingly, provision is made of means to guide the wire from the reel, which may include a roller 248 which is like the roller 244 (Fig. 32) having a deep groove in which the wire is guided. The roller 248 may be supported on a bar 249 carried by brackets 250 extending upwardly from the floor 67. From the roller 248, the wire is conducted to a similar roller 251, which is rotatably supported between fixed collars 252 on a bar 253 supported in foundations 254 and 255, upon which bed supporting frames 256 and 257 are located. From the last mentioned roller 251, the wire is conducted to the first groove in the guide roller 53 whence the wire extends to the bed 52. The walls of the hole, in the roller 248, through which the shaft 249 extends are curved so that said roller may traverse the rod and adjust itself, to the direction of the wire extending from the reel to the stationary guide roller 252, this direction varying as the wire unwinds from side to side of the reel.

The wheel bed 52 of each shaving unit may be secured to a shaft 258 supported in bearings 259 and 260 (Fig. 21) on the bed supporting frames 256 and 257, which are located respectively at the front and rear of the bed, said frames being connected to each other to increase their rigidity by bars 261.

The bed wheels are rotated by electric motors 262, each motor being connected through a coupling 263 with a gear transmission device 264 connected with the wheel shaft 258 by a coupling 265. The gear transmission device is designed to have a great speed-reducing, power-multiplying ratio, so that the wheel bed may be driven at proper cutting speed, by means of the high speed motor 262. To control the speed of the wheel beds, I provide a separate rheostat connected in the field of each motor 262. The rheostat 266a for the first wheel bed is manually operated and rheostats 266, for the succeeding wheel beds, are automatically operated, as will be explained. Each rheostat is located in an arch 267 formed in a foundation 268 extending upward from the floor 67 to support its motor 262 and the transmission device 264.

The means which prevents undue stress on the wire extending between the cutting units, may include a stationary roller 269 (Figs. 16, 18, 19 and 21) and a movable or dancer roller 270, around which rollers the wire is wrapped to form a take-up loop 271. The stationary roller 269 may be rotatably supported by a shaft 272 on brackets 273 secured to the foundations 254 and 255. The dancer roller 270 may be supported by a shaft 274 in brackets 275, slidingly supported on upper guide rods 276 and lower guide rods 277, all of the guide rods being supported at their lefthand ends (Figs. 18 and 19) in the brackets 273 and at their righthand ends in a bar 278 secured to the drum supporting frames 256 and 257. The guide rollers may be grooved like the guide rollers 70 and 71 (Fig. 6) to prevent rubbing where the wire crosses near the roller 269.

When the load is increased on any wheel, as for instance, the first wheel 52 (Fig. 16), which may result from varying hardness of the material in different parts of the wire, there is a tendency to reduce the speed of that wheel. The second wheel being then operating under normal conditions, at unreduced speed, the tension is immediately increased because the wire is being drawn from the loop faster than it is being supplied thereto. The increased tension draws the dancer roller 270 bodily toward the stationary roller 269, against the action of suitable tensioning means. Such means which may include an adjustable weight 279 operating on one or more sprocket chains 280, one end of each sprocket chain being secured to a fixed bar 281, and each chain extending downwardly around the guide roller 282, which carries the weight 279. From the guide roller 282, the chain extends upwardly over a sprocket 283 and is then connected to the bearing bracket 275 which supports the dancer roller 270. The sprockets 283 are secured to a shaft 284 supported in fixed brackets 285 secured to the frames 256 and 257. Thus the variations in tension and size of the take-up loop cause the dancer roller 270 to move back and forth and such movements of the roller cause partial rotations of the shaft which are utilized to effect corresponding adjustments of the field rheostat of the motor which drives the next succeeding or second wheel 52a, thereby varying the speed of said second wheel by and in accordance with increase or decrease of speed of the first wheel. On the other hand, if the second wheel slows down while the first wheel keeps on at normal speed, the intervening take-up loop lengthens, thereby increasing current supply to the second wheel and bringing it back to normal speed, regardless of its increased load. Thus the first or hand adjusted wheel sets the normal speed, controlling speed of the second wheel.

To connect the shaft 284 with the rheostat 266, the shaft extends rearwardly where it is supported in a bearing 287 on a block 287a extending up from the floor 67. A sprocket 288 (Figs. 20 and 21) secured to said shaft, is connected by means of a chain 289 to a sprocket 290, secured to a shaft 291 of the rheostat. By turning this shaft in either direction, the rheostat is adjusted to increase or decrease the speed of the motor 262 and consequently the speed of the bed.

To prevent injury to the dancer roll mechanism when a break in the wire releases tension on the dancer roll, I provide buffer springs 292 coiled around the guide rods 276 and 277. These absorb the shock when the dancer roll is suddenly pulled towards the supporting bar by the then unbalanced pull of the weight 279.

The speed of each succeeding wheel throughout the machine, is controlled by a rheostat which is automatically adjusted by a take-up means such as above described, located between it and the preceding wheel. Thus, differences in load resulting in differences of speed and resulting tension on the intermediate portions of the wire are utilized to adjust the power of the motor of the following bed, thereby regulating its speed and closely limiting the variation of tension between the beds.

The final wheel may similarly control the speed of the winding reel at the exit end of the machine by means of an interposed take-up loop and dancer roll mechanism, but the field rheostat operated thereby is preferably in series with a hand controlled rheostat operated from a central control station and the hand control being entirely practical, automatic control by the dancer roll and loop may be dispensed with.

Figure 22:
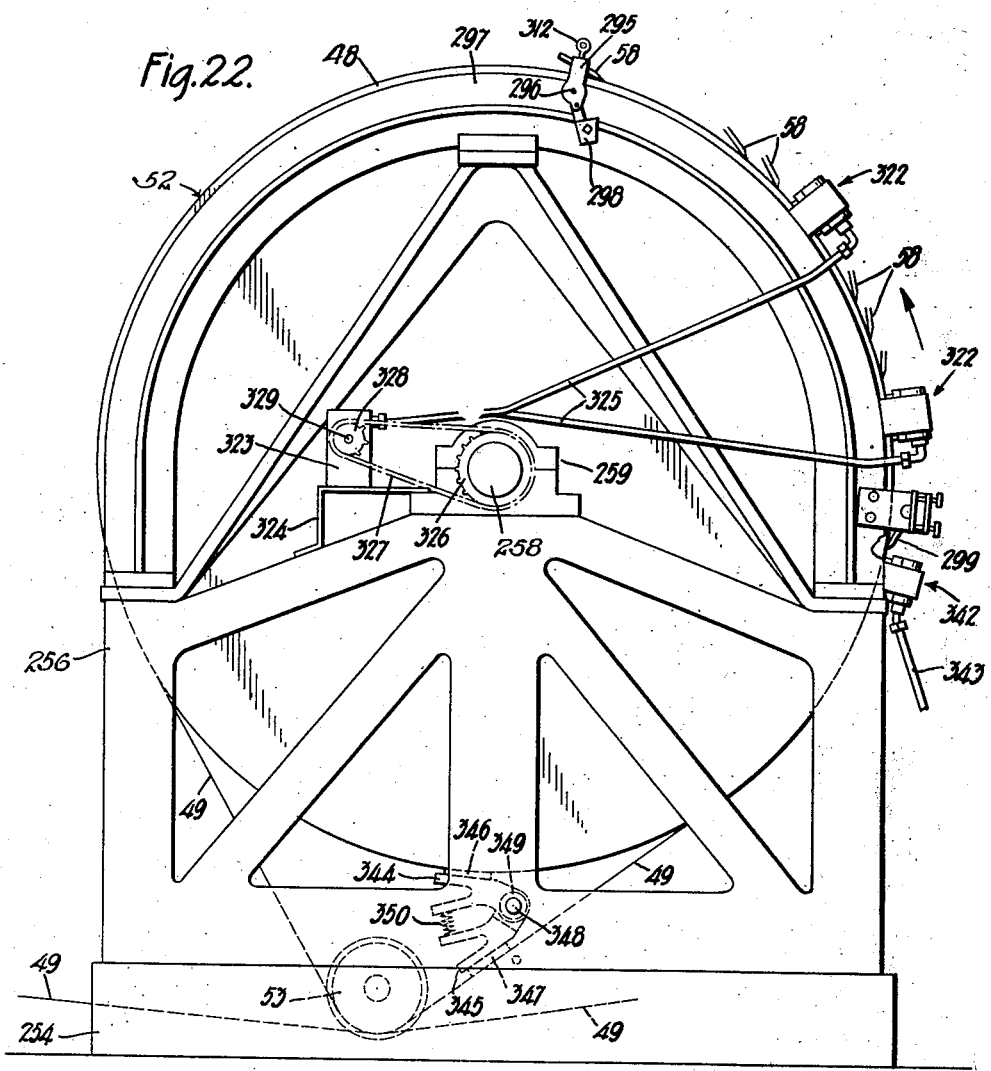
Fig. 22 is a front elevation of one of the shaving units, including the rotating traction bed, and illustrates the means for lubricating the wire; it also shows a fixed cutter to remove the slag or other undesirable material from the wire, and cleaners or wipers for the wire and bed.

The grooving knives, 58, may be like those in my above mentioned patent. They are arranged in groups around the periphery of the bed wheel as indicated in Fig. 22, where the size of the knives is somewhat exaggerated for clearness of illustration. Each knife is supported in a holder or bracket, 295, mounted to swivel about a pivot 296 on a semi-circular frame 297 extending adjacent the upper or cutter bed portion of wheel 52 and supported on the main frame 256. Each knife holder has connected thereto a weight, 298, which tends to force the cutting edge of the knife toward the wire which is supported in peripheral bed grooves.

Figure 27:
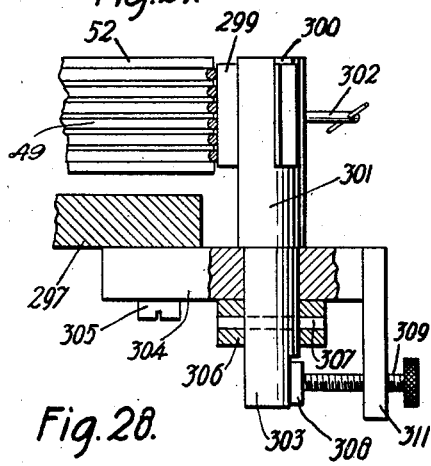
Fig. 27 is a top plan view, partly in section, of the planing knife or fixed cutter for removing the undesirable material from the wire.
Figure 28:
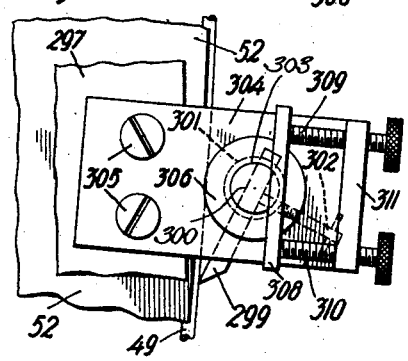
Fig. 28 is a front view of Fig. 27.

When particularly hard spots in the wire reach the knives 58, said knives tend to rise or jump, with the result that they do not produce the desired quality of shavings and, in fact, do not do enough cutting of any kind to be at all effective in removing said hard spots. To take care of this, I provide for each bed a special cutter or planing knife, 299 (Fig. 22), located preferably in advance of the grooving knives and arranged to operate as a gauge cutter for removing any undue thickness of metal from each loop of wire, before it again passes to said grooving knives. This gauge planer 299 may be located in a slot, 300 (Figs. 27 and 28), of a knife holder 301, and may be secured to said holder by a set screw 302. The holder is provided with a reduced shank 303, extending through a bracket 304 which may be secured to the cutter supporting frame 297 by screws 305. The holder 301 may be secured to bracket 304 by a collar 306, which may be secured to the shank 303 by a pin 307. The shank 303 of the knife holder is provided with a cross bar 308, constituting two arms extending to opposite sides of said shank. These arms may be engaged by set screws 310, supported by an extension 311 of the fixed bracket 304. By manipulating the set screws 309, 310, the knife holder may be rotated slightly about its axis to adjust the cutting edge of the knife 299 to the loops of wire on the bed. The planing knife is of sufficient width to engage all of the adjacent loops of wire on the bed and, when properly set, it does not touch the wire, so long as the grooving cutters 58 are functioning properly to remove the normal amount of metal. As soon as the attendant notices jumping of these cutters, he may swing them out of action where they may be held by suitable detents 312, which drop into apertures, not shown, in the periphery of the knife supporting frame 297. As soon as said grooving cutters are thrown out, the thickness of each loop reaching the planing knife 299 becomes correspondingly greater than normal, and the excess thickness that would ordinarily be removed by the grooving cutters 58 is presented to the special cutter 299, which planes a ribbon-like shaving from each loop, thus removing the undesirable material from the wire and reducing the wire to normal thickness. After this has been done, the wool producing cutters may again be rendered effective.

Figure 29:
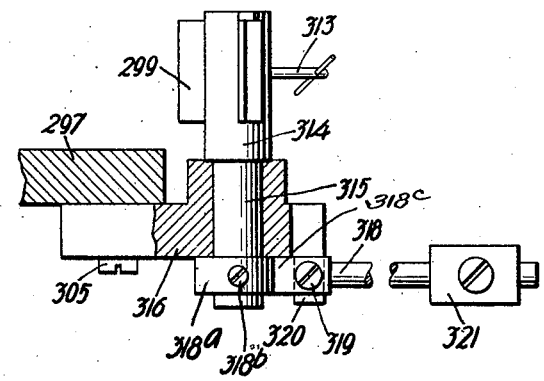
Fig. 29 is a top plan view of a modified form of planing knife.
Figure 30:
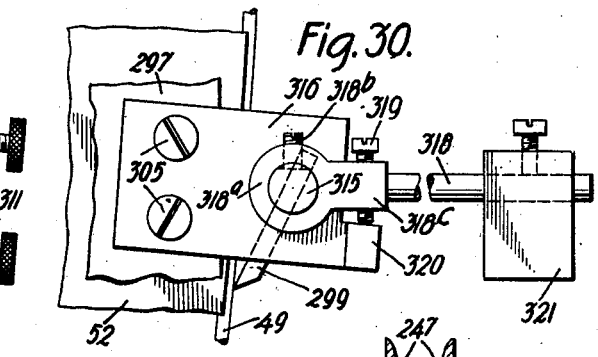
Fig. 30 is a front view of Fig. 29.

The planing knife may be mounted to operate as a fixed gauge cutter, but in such a way that it may be instantly thrown into or out of operative relation to the wire, as indicated in Figs. 29 and 30, wherein the planing knife 299 is secured in a holder 314 by lock-screw 313, said holder including a pivotal shank 315 which extends through a bracket 316 secured to the knife supporting frame 297. An arm 318 is secured to the shank by collar 318a and key-screw 318b. The collar has a radial projection 318c for an adjustable gauge screw 319 which bears against a fixed stop 320, extending from the bracket 316. The direction of thrust on the knife holder is such that it has little or no floating tendency, but it is free to be pivoted instantly away from the wire 49 on the bed 52. The limit of movement of said knife towards the bed is accurately gauged by the set screw 319. The weight 321 functions mainly as an inertia mass to steady the knife in its gauging position and to return it to said position.

While the planing knife may be mounted to operate as a fixed cutter, I prefer to have it mounted as a floating knife which will pivot away from the wire under excessive thrust and which tends to be automatically self-gauging for constant depth of cut, after the manner of the wool-grooving cutters. One such arrangement is shown in Fig. 44, where the knife 299 is secured in a holder 321a by a clamping screw 313a, the holder being mounted on a pivot 321b secured to the knife supporting frame 297. As in the case of the wool cutting knives, the pivot is designed to afford frictional opposition to all pivotal movements and there is a weight 321c to oppose pivotal movements away from the wire. In the present case, however, movement of said knife towards the bed is limited by the adjustable gauge screw 319a, engaging stop 321d. As the tendency to thrust the knife away from the wire increases with the thickness of the shaving being cut, the thickness of the shaving to be removed may be controlled by adjusting the counter-balancing weight. Thus I provide a positive gauge stop in combination with a knife which is capable of floating or self-gauging operation within desired limits and which is effective to cut a ribbon-like shaving from the wire, whenever its thickness is greater than the normal for which the gauge screw is set.

A lubricating or cooling agent, such as mineral oil, is supplied to the cutters, by applying it to the strands of wire. Such a lubricating system may include a plurality of lubricating devices, 322 (Fig. 22), one in advance of each group of cutters 58. A pump 323 of any suitable construction is supported on a bracket 324 on the main frame 256 and operates to force the lubricating agent through supply pipes 325 to said lubricating device 322. Preferably, pump 323 operates only when the bed 58 is rotating. Its driving means includes a sprocket 326 on the wheel supporting shaft 258. This sprocket drives a chain 327 connected with a sprocket 328 which rotates the pump shaft 329 and thus operates the pump to force the lubricant through the supply pipe 325 to said lubricating devices.

Figure 24:
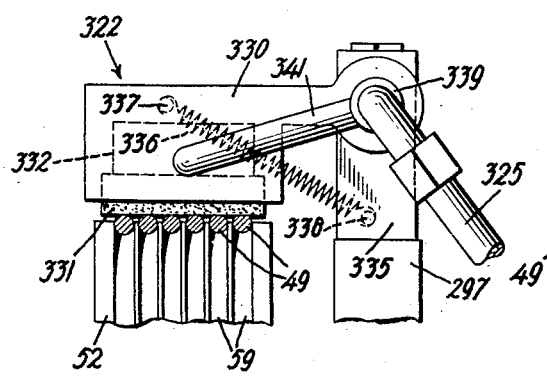
Fig. 24 is an end view of one of the devices of the wire lubricating system.
Figure 25:
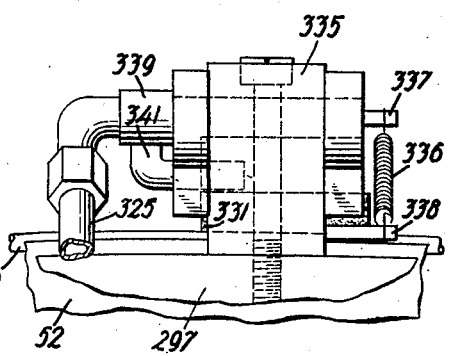
Fig. 25 is a front elevation of Fig. 24.
Figure 26:
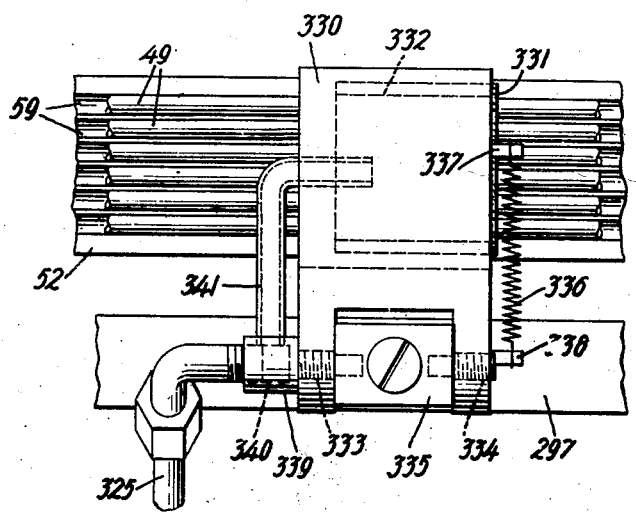
Fig. 26 is a top plan view of Fig. 25.

Each lubricating device, 322 (Figs. 24, 25, and 26) may include a cup-like element, 330, having secured therein a pad 331, which may be of felt, and to which the lubricant is supplied from a chamber 332 in said cup-like element, the lubricant being supplied to said chamber in a manner hereinafter described. The lubricating device is held resiliently against the lengths of wire 49 so that as they advance past said lubricating device, they are wiped by the pad 331, which is saturated with the lubricant. To resiliently hold said device against the wire, the cup-like element is supported by pivots 333 and 334 on a fixed bracket 335 which may be secured to the knife carrying frame 297, and a spring 336 is connected to a pin 337 of the cup-like element 330 and to a pin 338 of the bracket 335 to hold the pad of the lubricating device against the strands of wire. This arrangement enables the lubricating device to be thrown out of action by swinging the cup-like element upwardly about its pivot. To conduct the lubricant from the supply pipes 325 to the chamber 332, the pivot 333 may be provided with a head 339 having an aperture 340 in which the end of the supply pipes 325 is received. A tube 341 conducts the lubricant or liquid from the aperture 340 of the pivot stud to the chamber 332. Thus with this arrangement, the cup-like element may be swung about its pivot without disturbing the lubricant supply connection. It will be noticed in Fig. 26 that the end of the supply pipe is threaded into the head 339. This threading is loose enough to enable the head to rotate on the end of the supply pipes when the lubricating device is swung out of or into position.

A lubricating device 342 which may be constructed like the lubricating devices 322 is provided for the planing knife 299, and may be secured to the knife carrying frame 297. Since the work done by the planing knife 299 is considerably greater than the work done by anyone of the wool producing knives 58, it is desirable to use a different kind of cooling or lubricating agent. Accordingly, provision is made to supply the liquid from a separate source, which may be done by means of a pump, not shown, connected to said lubricating device 342 by a supply pipe 343.

Figure 23:
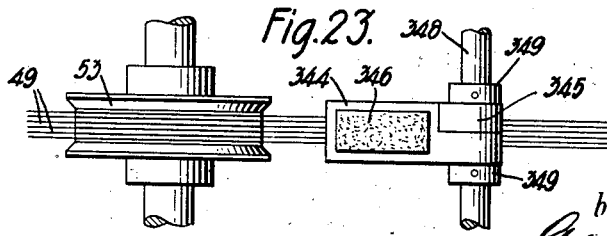
Fig. 23 is a detail top plan view of the wire cleaners.

To clean the grooves 59 in the periphery of the traction beds and also the loops of wire, wipers 344 and 345, respectively (Figs. 22 and 23), are provided at each bed. The wiper 344 is provided with a pad 346 which lies against the periphery of the bed; said pad may be of comparatively soft material, such as felt, so as to embed itself in the grooves. The wiper 345 is also provided with a pad 347, of comparatively soft material, and the loops being spaced considerable distances from each other, the pads engage a considerable portion of the circumference of the wire. The wipers are pivotally supported on a rod 348 extending between the frames 256 and 257. The wipers may be held in position lengthwise of said rod, in alignment with the bed and the loops of wire, by suitable collars 349. A spring 350 may be located between the wipers to separate them and force the wiper 344 against the periphery of the bed and the wiper 345 against the loops of the wire. It will be understood that the loops of wire extend from the bed at one side, downwardly towards and around the guide roller 53 and then upwardly back to the bed, and it is in this portion of the loops where the wipers are preferably located, so that the one may conveniently engage the periphery of the bed, while the other engages the surfaces of the wire that contact with the bed grooves. Thus the grooves and the wires are kept clean by brushing shavings and dust from each of them between every passage under the grooving knives.

To collect or gather the wool, there is provided at each bed a hood 351 (Figs. 21, 33, 34, 35 and 36). Each hood is concave and extends rearwardly from the periphery of the wheel bed so as to receive the wool as it is blown away from the cutters by air jets through nozzles 352 (Fig. 34), which are connected to an air supply pipe 353 as in my above mentioned patent. The wool is conducted by said hood into pockets 354, one at each side thereof, where it accumulates. Each hood also serves as a protector for the bearing 260 of the bed shaft 258 (Fig. 21.)

To convey the wool away from the machine, to a place where it may be readily accessible for storage or packing, I provide, at each pocket 354, an inclined chute 355, extending upwardly to an opening 356, in a wall 357. The wool may be elevated, by suitable means hereinafter described, and ejected from said opening to a bench 358 located in a room 359 (Fig. 33) adjoining the room 360 in which the shaving machine is located.

To convey the wool up the chute 355, I provide an elevator or carriage 361 arranged to travel up and down on a guideway 362, which may include a channel bar 363 reinforced by a second channel bar 364, said guideway being supported at its lower end by a bracket 365 supported on the foundation 247 upon which the wheel motor 262 is supported, the upper end of the guideway being supported against the wall 357. The carriage 361 may include two side plates 366 (Figs. 37 and 38) rigidly secured to each other by cross bars 367. Each side plate is provided with rollers 368 supported on headed studs 369 secured to the side plates 366, said rollers engaging the upper face of the channel bar 363. To assist in guiding the carriage and to retain it on the channel bar 363, I provide rollers 370 to engage under the channel bar 363, the rollers rotating on headed studs 371 secured to the side plates 366. The carriage is actuated in a manner hereinafter described, by means including a chain 372.

Each carriage is provided with a rake 373, to take hold of the wool which has been accumulated in the pockets 354. The rake has a plurality of prongs 374 carried by a rod or shaft 375 rotatably supported in the carriage 361, said prongs being secured to each other by a bar 376. The rake normally occupies a position near the floor 377 of the chute as indicated in full lines in Fig. 36, but when the carriage approaches the end of its downward movement, the rake is operated to swing it out of the chute to position 373a, so that it may pass over the mass of wool accumulated in the pocket 354 to draw it up in the chute. To swing the rake out of the chute, the shaft 375 has secured thereto an arm, 378, which is obstructed by a stop 379 so as to cause rotation of the shaft 375 to raise the rake to position 373a. As the downward movement of the carriage continues, the arm 378 moves clear of the stop 379, thus enabling the rake to drop into the pocket 354 to the position 373b, to take hold of the wool therein. The carriage is then moved upward along the guideway, thus elevating the mass of wool gripped by the rake. To enable the arm 378 to freely pass by stop 379, during the upper travel of the carriage, said stop may be supported on a pivot 380 (Fig. 34) secured to the channel bar 364 of the guideway; said stop being provided with an arm 381 which is normally held against a stop pin 382 by a spring 383. This permits the stop 379 to yield on the upward passage of the carriage. When the arm 378 has passed the stop 379, the latter is snapped back to its effective position by the spring 383.

When the bunch of wool reaches an intermediate position in its upward travel in the chute, it is pushed over a retaining device 384, shown as including two prongs 385 pivotally supported on a rod 386 carried by brackets 387 and adapted to engage or impale the rear portion of said bunch. The prongs may be provided at their lower ends with weights 388 which tend to keep them in an upright position. As the bunch of wool brushes by the prongs 385, while being pushed upwardly in the chute, said prongs swing rearward and downward in the direction of the travel of the wool, against the action of the weights 388. As soon as the wool has moved slightly past said prongs, they are returned to their normal positions by said weights 388, the return swing being limited by stops 388a. Thus, upon a subsequent descent of the carriage 361 for a fresh bunch of wool, the previously raised bunch is held in the intermediate position in the chute by the prongs 385.

A second rake 389 is supported by the carriage 361 and includes prongs 390 extending from a shaft 391 which is also pivotally supported by the side plates 366 of the carriage 361, said prongs being secured to each other by a rod or bar 392. As the carriage descends, this second rake 389 brushes over the pack of wool retained by the detent prongs 385, at the intermediate position in the chute, and drops behind said wool so that upon subsequent ascent of the carriage 361 the bunch of wool is pushed upward from its intermediate position by said rake 389 and is ejected through the opening 356 in the wall 357.

The hole 356 is normally closed by a door 393 which may be automatically opened when the bunch of wool is to be ejected. To this end, an arm 394 is secured to an extension 395 on one of the side plates of the carriage 361. Said arm is provided with a roller to engage the door 393 to swing it to open position, about a hinge 397, as the carriage advances, and prior to ejecting the wool through the hole 356.

To assist in ejecting the wool and clearing the pusher rake, said rake is swung upwardly to position 389a (Fig. 36) as the carriage approaches the end of its upward travel. For this purpose, the shaft 391 is provided with an arm 398 which is obstructed by a stop 399, secured to guideway 362, to rock the shaft 391 upon which the fork is supported.

The chutes between adjacent shaving units are close to each other as indicated in Fig. 35 and the carriage 361 instead of carrying a single pair of rakes as indicated in the left-hand end of Fig. 35 carries two pairs of rakes, one on each side thereof; the carriage guideway 362 being between said chutes. The rake supporting shafts 375 and 391 extend laterally from both sides of said carriage; each end of each shaft having a rake secured thereto.

Where two chutes are close to each other, the hole 356 in the wall may be wide enough to accommodate both chutes, the door 393 being also wider to close the wider hole.

All of the wool elevating carriages 361 may be connected to a single shaft 400 extending along the shaving machine. Said shaft has secured thereto sprockets 401 over each of which extends one of the chains 372 from its connected carriage. The shaft 400 is supported by hangers 402 (Figs. 33 and 34) and is automatically and reversely rotated to operate the chains 372 to lower and raise the carriages 361. Counter weights 403 may be connected to the ends of chains 372 to balance the elevator carriages 361. Where two sets of rakes are supported by a carriage, the counter weights may be increased accordingly.

Figure 33:
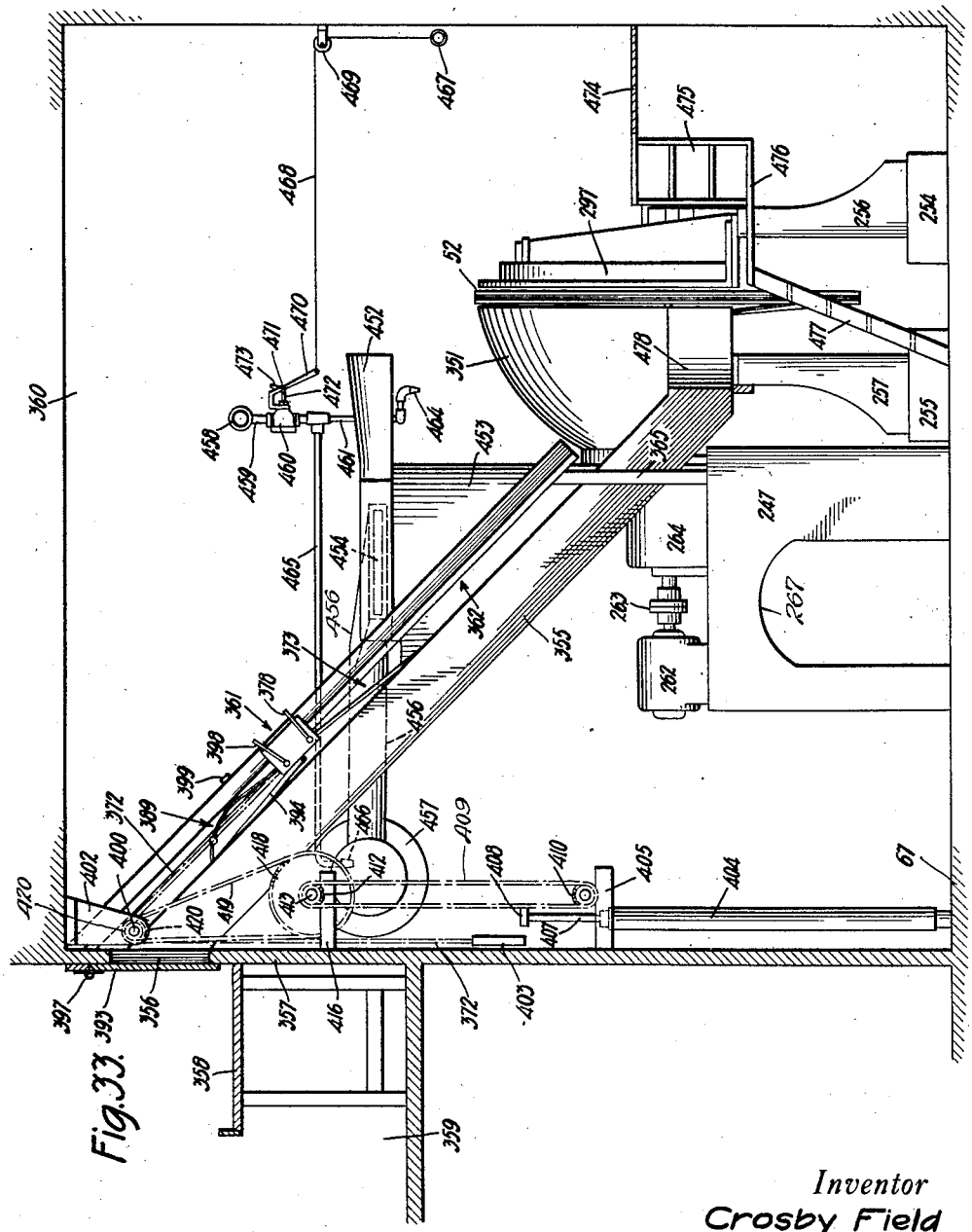
Fig. 33 is an end view of the machine and shows the means for discharging the wool from the machine, the means for exhausting the smoke and dust from the room in which the machine is located, and the fire protection system.
Figure 34:
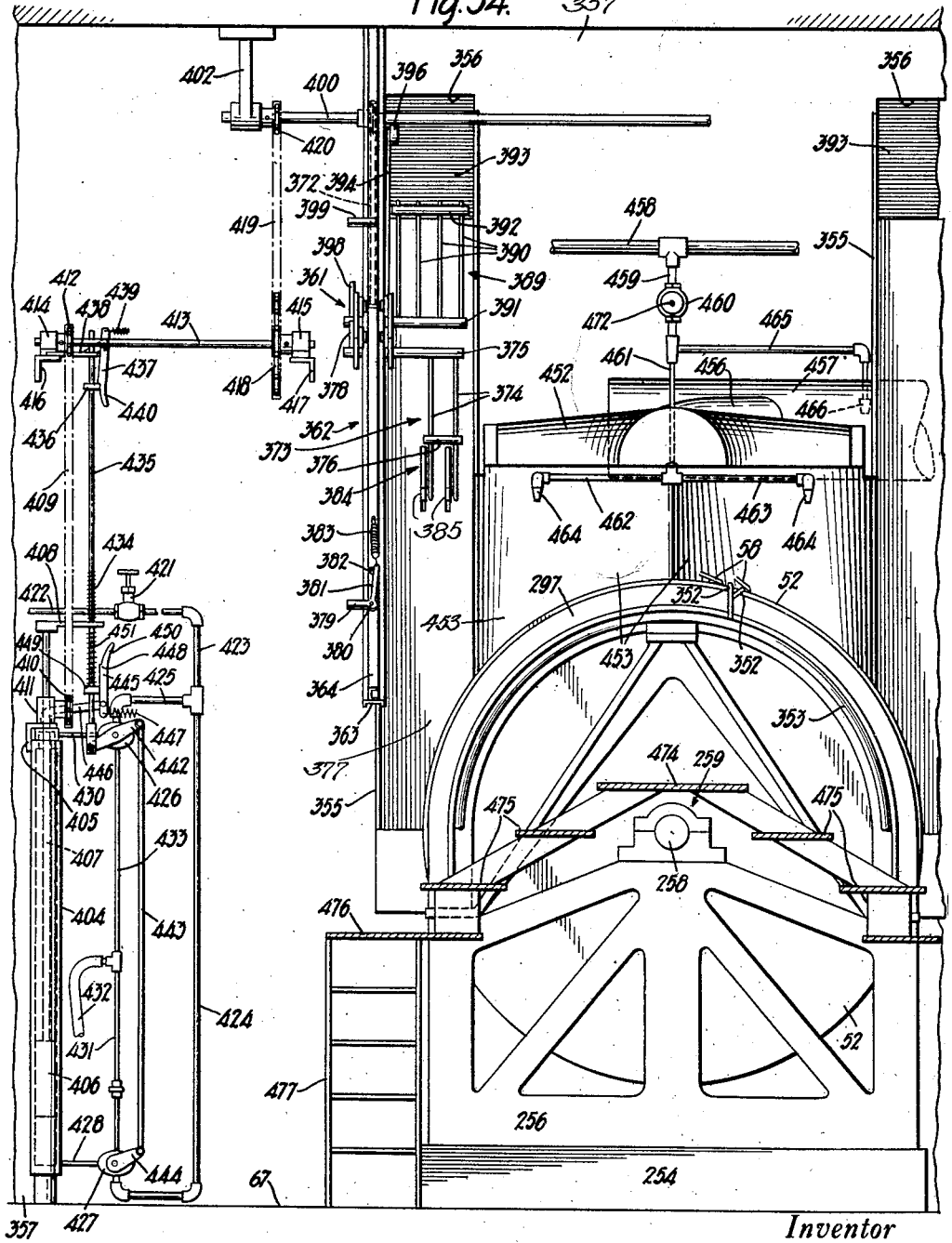
Fig. 34 is a front view of Fig. 33.

To operate the shaft 400, and thus cause the carriages to reciprocate on the guideway 362, there may be provided a pneumatic or hydraulic cylinder 404 (Figs. 33 and 34). Said cylinder may be vertically disposed and secured at its lower end to the floor 67 and at its upper end to the wall 357 by a bar 405. A piston 406, located within the cylinder has a piston rod 407 having at its upper end an arm 408 connected to a sprocket chain 409, said piston being operable in a manner hereinafter described to reciprocate in said cylinder to thus operate the sprocket chain 409 in opposite directions. The sprocket chain 409 may be guided at one end by a sprocket 410 which may be rotatably supported on a fixed bracket 411. The other end of the sprocket chain 409 engages a sprocket 412 secured to a shaft 413 to rotate the latter in bearings 414 and 415, supported on brackets 416 and 417 secured to the wall 357. A comparatively large sprocket 418 is secured to the shaft 413 and operates a sprocket chain 419 engaging with a smaller sprocket 420 secured to the carriage operating shaft 400. As the piston 406 is moved up and down in the cylinder 404, its movements are transmitted to the shaft 400 to cause it to rotate in reverse direction alternately and thus cause the wool elevating carriages 361 to move up and down on their guideways 362.

The operation of the piston 406 may be controlled by a valve 421 which may be located at a control board, 546 (Fig. 41) to supply the liquid to the cylinder through a pipe 422 extending from any source to said valve. From the valve, the liquid is conducted through a pipe 423 having branches 424 and 425 through either one of which the liquid is conducted, according to the direction in which the piston is to move. When the parts are in the position indicated in Fig. 34, the liquid is prevented from flowing through the branch 425 by a three-way valve 426, which may be of any well known construction, and the liquid is conducted through the branch 424 to a three-way valve 427, controlling flow through a pipe 428 into the lower part of the cylinder 407, to drive the piston upward. This rotates the shaft 400 in a clockwise direction (Fig. 33), causing downward movement of the carriage 361. When the piston reaches its upper position in the cylinder, the valves 426 and 427 are automatically operated, in a manner hereinafter to be described, to stop flow of liquid through the branch 424 and admit the liquid through branch 425, valve 426 and a pipe 446, to the upper end of the cylinder 404, to thus force the piston 406 downwardly.

During the shifting of the valve 427, communication is established through the pipe 428 and a pipe 431 connected with a discharge hose 432 through which the liquid below the piston escapes as the piston is being forced downwardly. When the piston reaches its lowest position, the valves are again shifted to their former position to shut off the flow of liquid through the branches 425 and again establish the flow through the branch 424. While the piston is being moved upwardly in the cylinder by the liquid admitted through the valve 427, the liquid above the piston is discharged through pipe 430, three-way valve 426 and pipe 433, which is also connected with the discharge hose 432.

To automatically shift the piston control valves 426 and 427 as the piston 406 approaches the upper end of the cylinder, an arm 408 connected to the upper end of the piston rod 407, slides vertically on a valve operating rod 435, carrying upwardly a spring 434 which is coiled around said valve operating rod 435. The upper end of said spring engages a stop 436 before the piston rod reaches the upper limit of its travel, so that the spring is compressed to store energy for subsequent use in operating the valves 426 and 427. Said spring tends to move the valve shifting rod 435 upwardly, but said rod is locked against such upward movement by a shouldered pawl 437 pivotally supported on a fixed racket 438, and held in engagement with the stop 436 by a spring 439. As the piston approaches its upward limit, the end of the arm 408 on the piston rod engages a tail 440 of the pawl 437 to swing the latter against the action of spring 439 out of engagement with the stop 436, whereupon the previously compressed spring 434 becomes effective to actuate the rod 435 and move it swiftly upwardly. The lower end of said rod is connected to a valve shifting lever 442 to swing the latter in a clockwise direction and thus operate the valve 426. The lever 442 is linked by a rod 443 to a valve shifting lever 444 of the valve 427 to operate the latter when the valve 426 is operated. Thus, when said valve operating rod 435 is moved upwardly, the valve shifting levers 442 and 444 are rotated in a clockwise direction so as to shut off the supply of liquid through the branch 424 and establish the flow of liquid through the branch 425 to reverse the movement of the piston 406.

During the shifting of the rod 435, a pawl 445 pivotally supported on a fixed bracket 446 is swung by a spring 447 to cause a shoulder 448 of said pawl to engage under a block 449 secured to the rod 435, to thus lock the rod, and the valves controlled thereby, in their shifted positions, while the piston is moved downwardly in the cylinder. As the piston approaches its lowest position, the arm 408 of the piston rod 407 engages a tail 450 to swing the pawl 445 out of engagement with the block 449. On the downward movement, a spring 451 similar to 434, is compressed between the block 449 and the arm 408, so that upon release of the rod 435 from the pawl 445, said spring 451 moves the rod 435 swiftly downward, operating the valve levers 442 and 444 in a counterclockwise direction to change the setting of the valves 426 and 427 to stop the flow of liquid through the branch 425 and re-establish the flow through the branch 424 for a subsequent upward movement of the piston. Thus, the rod 435, springs 434 and 451, pawls 437 and 445, and the blocks 436 and 449 constitute trigger mechanism for quickly operating the reversing valves 426 and 427.

To remove the dust and smoke which may be caused by the action of the cutters on the lubricated wire, I have provided exhaust means which may include a series of inverted hoods 452 one at each bed (Figs. 21, 33, 34 and 35). Walls 453 extend downwardly and rearwardly from each hood to merge in the walls of the chutes 355. In the upper ends of said walls 453 and directly under the hood 452, are provided apertures 454 from which extend branches 455 of a pipe 456 connected with the flue 457. At one end of the flue there may be connected a fan to draw the smoke and dust, which gathers under the hood, through the apertures 454, branches 455, pipe 456 and flue 457 to discharge it through said flue.

The sprinkler system (Figs. 21, 33, 34 and 35) which is provided to prevent the spread of fire, which may result from the action of the cutters on the wire, may include a water main 458 extending lengthwise of the machines over all of the cutting units. At each cutting unit, there is a branch 459, extending from said water main, and connected to a normally closed valve 460. From the valve there extends a pipe 461 having two branches 462 and 463 which branches may be located under the hood 452, said branches being provided at their ends with nozzles 464 located above the pockets 354. From the pipe 461, another branch 465 extends rearwardly into the flue 457, where said branch is provided with a nozzle 466. In case of fire, the valve 460 may be operated by a ring or finger piece 467 (Fig. 33) located in a convenient place. The finger piece is connected to a cord or chain 468, conducted over stationary guide roller 469, to swing a valve operating lever 470 about a pivot 471, to thus move a stem 472 inwardly to open the valve, said stem or plunger being operated by a cam 473 of the lever 470. Said valve 460 is of the quick operating type and remains open after it is operated. Upon opening of the valve, the water is forced through the nozzles 464 and 466 to spray the wool in the pockets and also spray the flue; the nozzle 466 located in the flue being effective to spray the dust which may be accumulated on the walls in the flue and thus prevent any possibility of progress of the fire in the flue.

Said nozzles are not only effective to extinguish the fire, but they wet all surfaces in the line of possible progress of the fire.

A suitably supported platform 474 may be provided along which the attendants may walk from one shaving unit to the other. At each shaving unit there may extend from the platform 474, a series of steps 475 to each side of the shaft 258 and to individual platforms 476. From each of the individual platforms 476, there is a ladder 477 extending downwardly to the floor 67. To enable the attendant to descend the ladder without obstruction by the pockets 354, each pocket may be indented as at 478 (Fig. 35).

Figure 41:
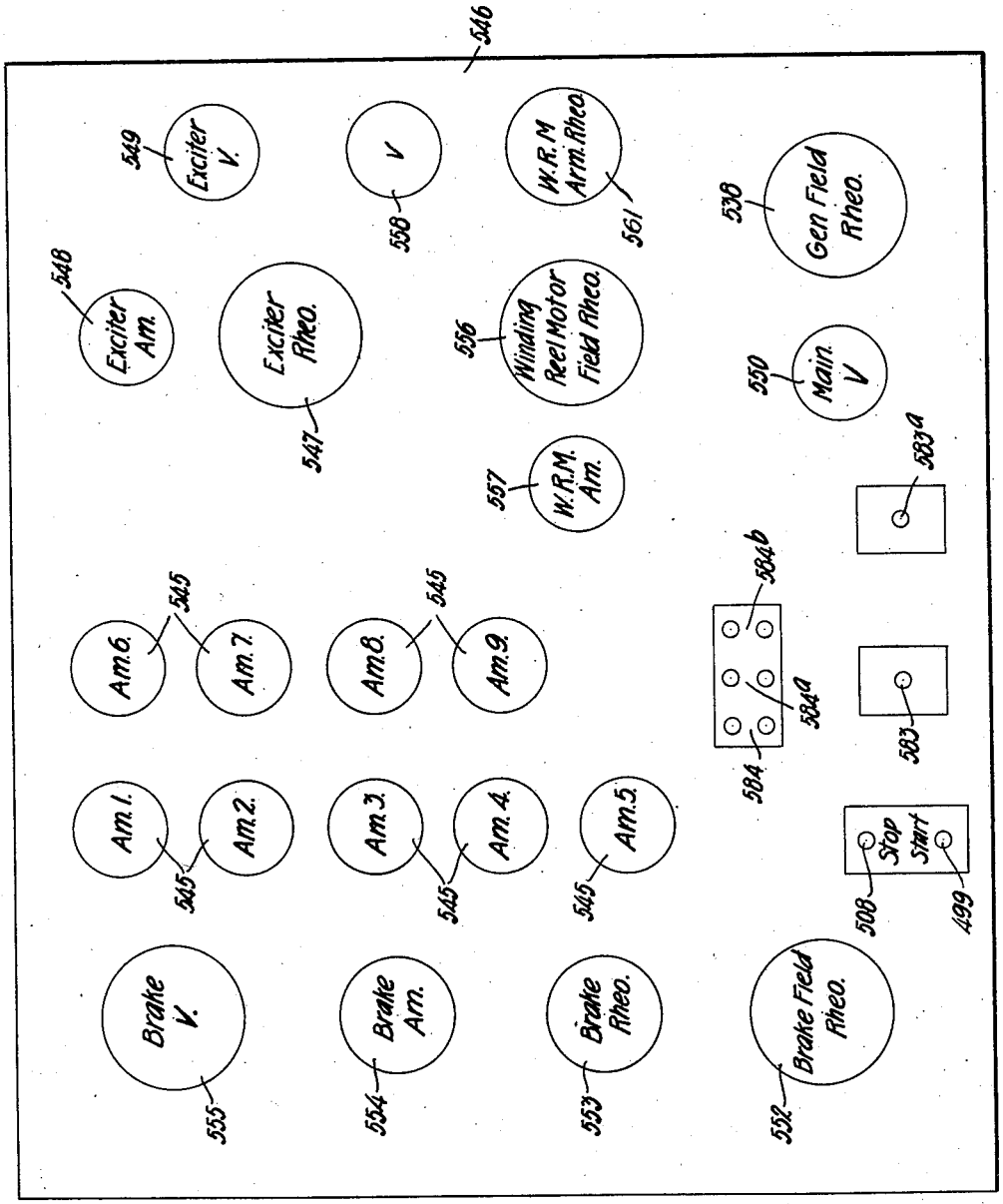
Fig. 41 is a plan view of the operator's board showing the various instruments mounted thereon.

The electrical system is illustrated in Figs. 39, 40 and 41, by which any desired speed from 5 feet to 800 feet per minutes may be obtained, and the beds or traction wheels may be brought to rest from a high speed within three feet of feed of the wire and with no slippage of the wire nor change of positions of the dancer rollers.

The machine is operated by a motor generator set 480, including a synchronous motor 481, which may be 3-phase, 60-cycle and taking 4150 volts, and the machine is started by connecting this motor to a source of electric energy in any well known manner. An exciter 482, driven by said motor 481, supplies energy to lines L 483 and L 484 and thus energizes the fields 485 and 485a of the exciter, field 486 of a generator 487, fields 488 of the bed driving motors 262, field 489 of the generator 216, connected with the wire feeding reel or supply reel 50 and field 490 of the motor driving the scrap winding reel 61; each field 488 of the bed driving motors 262 being connected with the lines L 483 and L 484 by branches 491 and 492, respectively; the field 489 of the wire-feed-reel-generator 216 being connected to the lines L 483 and L 484 by branches 493 and 494; the field 490 of the winding reel motor 233 being connected to the lines L 483 and L 484 by branches 495 and 496; and the generator field 486 being connected to the lines L 483 and L 484 by branches 497 and 498.

To supply energy from the generator 487 to the armatures of the motors, to drive said motors, there is provided a start button or switch 499, which is normally open, but when operative, permits the current to flow from the supply line L 483 through branches 497 and 500, switch 501, conductor 501a, the starting switch 499, conductor 502, solenoid 503, to energize the latter. The current returns from solenoid through conductors 504 to line L 484 and to exciter 482. Upon the energization of solenoid 503, armatures 505 and 506 are operated; the armature 505 closing a circuit over which energy is supplied from the line 502 (which, it will be remembered, is connected to the supply line L 483), through branch 507, normally closed stop switches 508 and 509 connected in the branch 507, through armature 505, conductors 510 and 511, coils of electrically operated switches 512 and 513, conductors 514 and 515 to a return branch 516 connected to the line L 484, thus energizing the relays 512 and 513 to pull up armatures 517, 518 and 519 and thus connecting lines G 521 and G 522 with the generator 487. Said generator is connected to the line G 521 by a conductor 523, armature 519, conductor 524, and a branch 526. The generator 487 is connected to the line G 522 by a line 527, and armature 517 which is connected to the line G 522. The bed driving motors 262 which may be either shunt or compound wound, are connected in parallel with the current supply lines G 521 and G 522, each by a conductor 528, an over-load relay 529, a conductor 530, one leg 531 of a switch 532, conductor 533, motor conductor 535, leg 536 of said switch, and conductor 537, which is connected with the line G 522. Thus the armatures of the bed driving motors 262 receive their energy from the generator 487.

To control the voltage on the armatures of the bed driving motors 262 and thus bring them gradually to the desired speed, which varies according to the material to be cut, there is provided a field rheostat 538 having a wiper 539 on a shaft 540 rotatable by a finger piece 541 by which the resistance in the generator field circuit may be reduced gradually, to increase the voltage of the generator 487.

The switch element 501, in series with the start button 499, is secured to the rheostat shaft 540 and is arranged with respect to the wiper 539, so that the generator field 486 is at a minimum excitation when the switch closes the line 500, 501a, and thus the bed driving motors 262 may be started with a low voltage upon the closing of the start switch 499. It will be understood that if the switch 499 is closed while the switch 501 is open, the relay 503 is not energized and consequently the generator 487 is not connected with the lines G 521 and G 522 which lines, it will be remembered, are connected with the generator upon the operation of the switches 512 and 513, the latter being operated by the energization of the solenoid 503.

To automatically break the generator circuit when any one of the traction wheels 52 becomes over-loaded, there is provided for each one of said wheels a series of over-load relays 529, said relays being connected in multiple with the lines G 521 and G 522 and each in series with each armature of the associated motor 262. Each relay 529 is provided with an armature 541, all of the armatures 541 being connected in series in the line 516 so that the circuit through switches 512 and 513 may be automatically broken by an actuation of any one of the armatures 541, by its winding when there is an over-load on the associated bed or traction wheel. The generator 487 is thus disconnected from the bed driving motors.

As soon as the current supplied to the motors is cut off, said motors continue to run due to the inertia of the connected parts such as the traction wheels. The motors then operate as generators to supply current to the conductors G 521 and G 522. To expend the energy thus supplied and also bring the traction wheels to a stop within a short distance of travel, there is automatically connected to the conductors G 521 and G 522, a dynamic brake 542 (Fig. 40), one end of which is connected to the conductor G 522, the other end being connected to the armature 506 of the solenoid 503. While said solenoid is energized, the armature 506 is held away from contact 542a, which contact is connected, by branch 526, to the conductor G 521. Upon the de-energization of the relay 503, as above described, the armature 506 drops back against the contact 542a, thus closing the circuit including the conductors G 521, G 522 and dynamic brake 542. When the relay 503 is energized upon the operation of the start button 499, as previously described, the armature 506 is operated to disconnect the dynamic brake 542 from the bed driving motors.

An interlocking device, 543 (Fig. 40) may be provided to prevent connection of the dynamic brake resistance 542 across the main generator armature conductors 523 and 527, when the traction bed driving motors are operating as motors. Said interlocking device may include elements 543a and 543b which are connected to the armatures 506 and 519 to be operated thereby to the dotted line positions so that the armature 506 cannot return to contact 542a until the switch 512 is de-energized.

A multiplicity of the switches or push buttons 509, are connected in series with the stop button 508 in the line 507, so as to facilitate the stopping of the machine manually, said switches being distributed throughout the plant in a manner so that at no time can any one of the several attendants of the crew be out of reaching distance of at least one of the switches to stop the plant if necessary.

To indicate the load on each bed, there is provided for each shaving unit, an ammeter 545. These ammeters may be located on a central control board 546 (Fig. 41), so that they may be observed by a supervisor who recognizes, by reading said ammeters, whether each unit is functioning properly. The generator field rheostat 538 and the start and stop buttons 499 and 508 may also be mounted on the control or instrument board under the control of the supervisor. An exciter field rheostat 547, an exciter ammeter 548, and an exciter volt meter 549 (Fig. 41) may also be mounted on the instrument board 546. The generator 487 is provided with a volt meter 550, which may also be mounted on the board 546.

The reel motor 216, as previously stated, runs as a generator by being run backwards, while the wire is being drawn from the reel 50 into the shaving machine, thus producing a braking action on the reel. There is connected in series with the field 489 (Figs. 39 and 41) a rheostat 552. A variable rheostat 553 is connected across the armature of the reel motor 216 to vary the braking effect of the reel motor as desired. An ammeter 554 and a volt meter 555 may be connected in the armature circuit of said reel motor; the rheostats 552 and 553 being adjusted according to the readings of the ammeter 554 and volt meter 555; the field rheostat 552, rheostat 553, ammeter 554 and volt meter 555 being mounted on the supervisor's control board 546.

There is provided a rheostat 556 for the field 490 of the motor 233 associated with the winding reel 61 which is adjustable in accordance with reading of an ammeter 557 and a volt meter 558, both mounted on the control board 546, and connected in the armature circuit including the conductors 559 and 559a which conductors are connected to the lines G 521 and G 522 extending from the generator 487. A rheostat 561, also mounted on the control board, is connected in the armature circuit, including the conductors 559 and 559a.

A relay 561a (Fig. 40) is connected, by branches 562 and 563, to branch 511 and line L 484, to be energized upon the energization of the relay 503 which, it will be remembered, is effected by the closing of the start switch 499. The relay 561a operates two armatures 564 and 565, the armature 564 opening a circuit including 567 and 568 and the armature 565 opening a circuit including conductors 569 and 570, so that the current supplied to the motor 233 passes through the rheostat 561 while the machine is running.

As soon as the solenoid 503 is de-energized, which may be effected by operating the switch 508 or any one of the switches 509, or by the operation of any one of the overload relays 529, the relay 561a is also de-energized and the armatures 564 and 565 drop back to close their respective circuits, thus shunting out the rheostat 561 and closing the armature circuit of 216 containing resistance 533, thus causing the generators 216 and motor 233 to come to rest at approximately the same time as the traction bed motors 262, because motor 233 is then connected, in parallel with the bed motors, across the dynamic brake 542, without additional resistance, and the armature of generator 216 is then short-circuited. A signal, which may be in the form of a light 561a, may be connected in series with the relay 561a to indicate that the armature current is on busses G 521 and G 522 supplying the bed driving motors.

It should be understood that, with this arrangement of dynamic brake, all of the motors 262 and 233 are acted upon individually, thus preventing over-running and breaking of the wire.

To string or thread the wire around the series of beds, the end of the wire is fastened to strong flexible cable of the "aeroplane" type, which is passed around the first bed or wheel 52, the cable due to its flexibility seating itself in the bed grooves, more readily than the wire 49, particularly if the wire be heavy. The free end of the cable is pulled by hand, so that just the proper tension is produced on the wire, and is passed around the guide rollers 53, 269 and dancer rollers 270 and proceeds from bed to bed. As the operator keeps the cable taut by hand, all the beds and rollers of the cabled bed and the latter may be operated at a slow speed, about 10 to 30 feet per minute. As the wire wraps around a bed, the dancer roller preceding it moves away from the buffer springs 292 to a normal running position or the buffer springs may follow the dancer rolls as in Fig. 18. In case there should occur a break in the wire, the ends of the wire are brought together at a convenient place and welded end to end and the slack, if any, is taken out of the wire, after which the beds may again be started for cutting.

To assist in threading the wire through the machine, provision is made for rotating the beds individually. To this end the switches 532 are provided in the armature circuits of the bed driving motors 262 so as to connect only those desired with the current, leaving the other motors at rest.

Slack is usually obtained after threading the machine. This may be taken up by running the beds reversely to the cutting direction, or backwards. To this end, the switches 532 may be thrown to poles 572 and 573 to reverse the current through the motor armature and thus reverse the rotation of the motor to drive the connected beds backwards. To drive the supply reel motor 216 backward, to wind up the wire and take up slack in advance of the first bed, there is provided a switch 574 in the armature circuit, which may be thrown to poles 575 and 576 to connect the motor with the lines G 521 and G 522.

The winding reel 61 may also be rotated backward to unroll some of the wire therefrom, for instance, when the wire is to be welded to wire extending from the last bed after a break. To this end, a switch 577 may be thrown to poles 578 and 579 to reverse the current through the armature and thus drive the motor in the opposite direction.

As the wire unwinds from the delivery reel 50, the diameter of the coil of wire decreases and braking of the reel must be correspondingly decreased. The winding of the motor 216, then running as a generator, is such as to afford a certain amount of the required variation of the braking effect, but beyond certain limits the variation of the braking effect is regulated by the rheostats 552 and 553.

Similarly the diameter of the coil on the winding reel 61 increases while the wire is being wound thereon and more power is required to keep the same pull on the wire. The winding of the motor 233 is such as to compensate for this automatically within certain limits, and beyond these limits the rheostats 556 and 561 may be regulated manually to assist in maintaining the constant pull on the wire, about four such adjustments being required for a long coil. Instead of such hand regulation, the speed of the winding reel 61 may be regulated automatically, as in Fig. 43, by arranging in series with the field 490, a rheostat 580 controlled by a dancer roller 270, the variation in bodily displacement of which is caused by the variation in surface speed of the coil on the reel 61 as compared with the surface speed of the bed 52$h$. The manually operated field resistance 556 and manually operated armature resistance 561 may be used with the automatically controlled rheostat 580 when cutting certain kinds of material. Thus the speed control of the winding reel 61 is similar to the speed control of the traction wheels.

The braking tension of the supply reel 50 may also be controlled automatically by means including a dancer roll 270 (see Fig. 42), acted on by a loop 271 of wire between the supply reel and the first traction wheel 52. In this case, the variation in the size of the loop is caused by increasing effectiveness of the braking means due to diminishing radius (leverage) of the supply coil on reel 50, as well as by variations in surface speed of the wheel 52. The variation of the size of the loop 271 causes bodily movement of the dancer roll 270, such movement operating to adjust a rheostat 581 which may be connected in series with the field 489 of the motor 216, which is then being rotated by the wire and functioning as a generator to afford the desired braking effect.

It will be understood that the automatic rheostat 581 may be used either with or without the manual rheostat 552 and that the entire automatic control is preferable in certain cases for cutting certain kinds of material.

Stop switch or button 583 may be mounted on the instrument board 546, and connected in the power circuit of synchronous motor 481 to stop the latter at will. A stop button switch 583$a$ may also be provided on the instrument board and connected in the circuit a motor (not shown) to drive an air compressor (not shown) which supplies the air to the nozzles 352.

Push button switches 584, 584$a$ and 584$b$ may also be mounted on the instrument board 546, and are connected to red, orange and green lights (not shown) which may be located at various stations in the plant for use in directing the crew during operations. The valve 421 which controls the operation of the wool conveyors may be located at the central station to be operated by the supervisor of the crew of attendants.

I claim:

1. An automatic plant for reducing wire to metal wool including a power driven traction rotor around which the wire is looped, a stationary wool cutting tool coacting with one part of the periphery of said rotor, a guide shield extending outward from said rotor from the vicinity of said tools, and an auxiliary cutting tool serving to remove undesirable material from the wire, said auxiliary cutter coacting with a part of said rotor beyond said shield, thereby to segregate the coarse scrap produced thereby from the steel wool produced by the wool cutting tools.

2. An automatic plant for reducing wire to metal wool comprising a series of power driven traction rotors around which the wire is looped, cutting tools coacting with the upper halves of the respective rotors and serving to reduce the wire to steel wool in a single pass, stationary curved shields extending from the upper halves of the rotors from one face thereof to direct the wool therefrom away from the cutting tools, each of said rotors having an associated auxiliary cutting tool adapted to remove undesirable metal from the wire, said auxiliary tool being beyond the shield of its rotor, in order to cause the scrap shaving thereby produced to become segregated from the wool fed along the guide shields.

3. An automatic plant for reducing wire to metal wool including a power-driven traction rotor having the wire wound therearound, cutting tools associated with said rotor, a downwardly curved stationary shield extending from one face of said rotor, means for applying air jets adjacent the cutting tools and substantially along the shield to direct the wool outward along the shield and to aid in separating any small foreign particles from the wool, and blowing them into the air and a ventilator above the hood for sucking up said particles without entraining the wool.

4. The combination set forth in claim 3 in which an oil is fed to the wire to cool and lubricate the cutting surface, and in which a fire extinguishing system is directed over the steel wool collecting pocket or pockets.

5. An automatic plant for reducing wire to metal wool including a series of power drive traction rotors around which the wire is wrapped to form successive loops, cutting tools coacting therewith to form the wool, means for applying a lubricating fluid to said cutting tools, each of said rotors having a downwardly curved stationary shield extending from one face thereof, pockets between successive shields into which the lubricant moistened wool sliding along the shields collects, means applying air jets adjacent the cutters to direct the wool strands outward along the shields, and to separate any loose particles therefrom and blowing them into the air and a ventilator hood extending over each shield to intercept such loose particles.

6. An automatic plant for reducing wire to metal wool, including a power driven traction rotor around which the wire is wrapped, cutting tools coacting therewith, a stationary guide shield directing the wool formed by said cutters toward the sides thereof, wool conveyor chutes at opposite ends of said shield and a ventilator hood extending over said shield and between said chutes and communicating with the latter.

7. A machine for making steel wool, including two circular beds around each of which a wire is conducted to form a multiplicity of loops, the wire extending from the exit side of one bed to the entrance side of the other bed, a plurality of grooved shaving knives to produce a series of shavings from each loop of wire, means to render said knives ineffective, a planing knife associated with the first bed which is normally ineffective but which becomes effective to cut a ribbon-like shaving from each wrap when the grooved knives are rendered ineffective, the action of the planing cutter having a tendency to reduce the speed of the first bed, and elastic compensating means cooperating with the wire extending from one bed to the other to keep the wire taut on both beds when the speed of one is changed with respect to the other.

8. A machine for making steel wool, including two circular beds around each of which a wire is conducted to form a multiplicity of loops, the wire extending from the exit side of one bed to the entrance side of the other bed, a plurality of grooved shaving knives to produce a series of shavings from each loop of wire, means to render said knives ineffective, a planing knife associated with the first bed which is normally ineffective but which becomes effective to cut a ribbon-like shaving from each wrap when the grooved knives are rendered ineffective, the action of the planing cutter having a tendency to reduce the speed of the first bed, and elastic compensating means cooperating with the wire extending from one bed to the other to keep the wire taut on both beds when the speed of one is changed with respect to the other; separate driving means for each bed, and means operable by the compensating means to control the driving means of the second bed to synchronize the speeds of said beds.

9. An automatic plant for reducing wire to metal wool including a series of power driven traction rotors around which a wire is wound, and having parallel shafts, cutting tools coacting with the upper part of each of the respective rotors, downwardly curved stationary shields for directing the cut wool from the tools, pockets between consecutive shields, in which the wool collects, conveyor chutes extending in planes parallel to the rotor shafts for removal of the wool from said pockets, and ventilator hoods over the respective shields extending in the space between the neighboring chutes and in communication with the latter.

10. A continuous process for reducing wire to metal wool and scrap, which includes simultaneously subjecting different portions of the same wire to the cutting action of enough knives to remove the entire usable portion, advancing the wire by a multiplicity of independently actuated traction rotors engaging successive portions of said wire at suitably distributed points along its length; utilizing the tension of the wire between tractor rotors to regulate the speed of the wire by and in accordance with changes of tension on the wire; and minimizing breaks of the wire under the varying tension within the machine by the preliminary step of subjecting the wire, in the course of its entry into the machine, to stress sufficient to break it at spots too weak to stand the stress within the machine, cutting out the defective portions and rewelding adjacent ends of the wire.

11. The method defined by claim 10, with the further feature of welding successive coils of the wire end to end and including them in the portion subjected to the preliminary testing strain.

12. A process for reducing metal wire to wool, which includes simultaneously shaving different portions of the same wire in successively arranged shaving units; advancing the wire by successive, independently actuated traction rotors engaging the wire at suitably distributed points; utilizing the tension of the wire between tractor rotors to regulate the speed and tension of the wire by and in accordance with changes in said tension; and minimizing breaks of the wire under the varying tension imposed by the tractors, by the preliminary step of subjecting the wire, in the course of its entry to the first traction rotor, to stress sufficient to break it at spots too weak to stand said stress; cutting out the defective portions and rewelding adjacent ends of the wire.

13. An automatic plant for reducing wire to clean long-fibre wool, said plant including a power driven traction rotor around which the wire is tightly looped, a series of associated cutting tools located above the horizontal diameter of the rotor, a curved stationary guide shield extended from one face of said rotor and below said tools, and directing the steels wool away from the latter, means producing air jets adjacent the cutting tools to direct the wool strands along the shield, and to loosen small foreign particles therefrom, a ventilator hood above said shield to suck up such particles, and an auxiliary cutting tool below the guide shield coacting with the looped wire to remove undesirable metal therefrom, whereby the latter becomes automatically segregated from the steel wool passed along the shield.

14. An automatic plant for reducing wire to clean metal wool in long strands, said plant including a power driven traction rotor around which the wire is looped, cutting tools coacting with the upper half of said rotor, wiper means to remove dirt and chips from the rotor body and from each part of the length of the wire as the latter moves toward but before it engages the former, cutting fluid for said tools, stationary curved guide shields directed from one face of said rotor to guide the wool away from the tools, means generating air jets for blowing the wool strands away from the tools along said shield and separating foreign particles therefrom and a ventilator hood above said shield for withdrawing said particles.

15. An automatic plant for reducing wire to clean metal wool in long strands, said plant including a power driven traction rotor around which the wire is looped, cutting tools coacting with the upper half of said rotor, wiper means to remove dirt and chips from each part of the length of the rotor body and from the wire as the latter moves toward but before it engages the former, cutting fluid for said tools, stationary curved guide shields directed from one face of said rotor to guide the wool away from the tools, means generating air jets for blowing the wool strands away from the tools along said shield and separating foreign particles therefrom, a ventilator hood above said shield withdrawing such particles therefrom, a wool collector to which the guide shield feeds, and an upwardly directed conveyor chute for removing the wool and draining any excess fluid therefrom.

16. An automatic plant for reducing wire to clean metal wool of long strands, said plant including a series of power driven traction rotors, metal wire wound in loops about the successive rotors to be converted into wool in a single pass through the machine, cutting tools coacting with said rotors at the upper halves thereof, guide shields directed from one face of the respective rotors, means wiping any dust or chips from each length of each rotor bed and from the wire fed thereonto, and before such wire length engages the rotor means producing air jets directed along said shields, to lead the wool strands away from the cutting tools and to separate any foreign particles therefrom, a ventilator hood above each of said shields to draw away such particles while leaving the wool behind, each of said rotors having an auxiliary cutter below the shield thereof to remove undesirable material from the wire to cause the scrap thus produced to be segregated from the wool produced by the upper cutting tools.

17. An automatic plant for reducing wire to metal wool and scrap, said plant including a succession of power driven traction rotors, a supply reel beyond the first of said rotors from which a wire is looped about said rotors successively and a winding reel beyond the last of said rotors to collect the scrap therefrom, cutting tools coacting with the upper halves of the respective rotors, downwardly directed guide shields for the wool extending from one face of each of said rotors, wool collecting pockets between adjacent guide shields, foundations beyond said guide shields, individual driving motors for the respective rotors mounted on said foundations, and aligned with the respective rotor shafts, a portion of each of said shafts extending under the corresponding guide shield, upwardly directed wool conveyor chutes extending from said pockets and having operating means for lifting the wool therealong, and separating walls between the respective motors and the pockets to protect the motors from the wool.

18. An automatic plant for reducing wire to metal wool and scrap, said plant including a succession of power driven traction rotors, a supply reel beyond the first of said rotors from which a wire is looped successively about said rotors and a winding reel beyond the last of said rotors to collect the scrap therefrom, cutting tools coacting with the upper halves of the respective rotors, downwardly directed guide shields for the wool extending from one face of each of said rotors, wool collecting pockets between adjacent guide shields, foundations beyond said guide shields, individual driving motors for the respective rotors mounted on said foundations, and aligned with the respective rotor shafts, a portion of each drive shaft extending under the corresponding guide shield, upwardly directed wool conveyor chutes extending from said pockets and having operating means for lifting the wool therealong, separating walls between the respective motors and the pockets to protect the motors from the wool and ventilators extending above the respective shields between the successive conveyors, said hoods having lateral communication with said conveyors.

Signed at New York in the county of New York, and State of New York, this 15th day of June, A. D. 1927.

CROSBY FIELD.